United States Patent
Petersen et al.

(10) Patent No.: US 12,095,618 B2
(45) Date of Patent: *Sep. 17, 2024

(54) APPARATUS AND METHODS FOR OPTIMIZING CAPACITY IN WIRELINE CABLE NETWORKS WITH VIRTUAL SERVICE GROUPS

(71) Applicant: CHARTER COMMUNICATIONS OPERATING, LLC, St. Louis, MO (US)

(72) Inventors: Matt Petersen, Highlands Ranch, CO (US); David Claussen, Evergreen, CO (US); Roger Stafford, Thornton, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,825

(22) Filed: Dec. 19, 2022

(65) Prior Publication Data
US 2023/0119774 A1    Apr. 20, 2023

Related U.S. Application Data

(63) Continuation of application No. 16/986,131, filed on Aug. 5, 2020, now Pat. No. 11,533,227.

(51) Int. Cl.
*H04L 41/0823* (2022.01)
*H04L 12/28* (2006.01)
*H04L 47/125* (2022.01)

(52) U.S. Cl.
CPC ...... *H04L 41/0823* (2013.01); *H04L 12/2801* (2013.01); *H04L 12/2898* (2013.01); *H04L 47/125* (2013.01)

(58) Field of Classification Search
CPC . H04L 41/08; H04L 41/0803; H04L 41/0813; H04L 41/0823; H04L 41/0826;
(Continued)

(56) References Cited

U.S. PATENT DOCUMENTS

2008/0092181 A1* 4/2008 Britt ............... H04N 21/482
                                                    348/E7.071
2008/0273548 A1   11/2008 Leano et al.
(Continued)

FOREIGN PATENT DOCUMENTS

CA         3158587 A1 *  5/2021  ......... G06F 9/45558
CN       102812450 A    12/2012

OTHER PUBLICATIONS

CableLabs Technical Report CM-TR-PMA-V01-180530.
(Continued)

*Primary Examiner* — Kevin D Mew
(74) *Attorney, Agent, or Firm* — Patent Beach PC

(57) ABSTRACT

Apparatus and methods for optimizing bandwidth utilization and services in a data network infrastructure. In one embodiment, the data network is a managed Hybrid Fiber Coaxial (HFC) cable network, and the network infrastructure is configured to enable dynamic allocate of frequency bands to individual consumer premises device (e.g., DOCSIS-compliant cable modems). In one variant, the improved network infrastructure enables creation of virtual Service Groups (vSGs), and allocation of individual ones of the CM to such vSGs, to some degree irrespective of topological or "hardwired" location within the network. The allocations can be dynamic, and based on factors such as load balancing, evacuation of portions of the physical network topology (such as to support infrastructure upgrades or replacement), or for yet other reasons such as relating to subscriber tier or service level agreement (SLA).

20 Claims, 22 Drawing Sheets

(58) Field of Classification Search
CPC . H04L 41/0833; H04L 12/28; H04L 12/2801; H04L 12/2859; H04L 12/2861; H04L 12/2863; H04L 12/2865; H04L 12/2898; H04L 47/10; H04L 47/12; H04L 47/125
See application file for complete search history.

(56) References Cited

U.S. PATENT DOCUMENTS

| | | | |
|---|---|---|---|
| 2011/0053623 A1* | 3/2011 | Rovira | H04N 21/6118 455/507 |
| 2012/0210416 A1* | 8/2012 | Mihelich | H04L 47/125 726/11 |
| 2012/0226792 A1 | 9/2012 | Johnson et al. | |
| 2015/0092531 A1* | 4/2015 | Bernstein | H04L 47/125 370/254 |
| 2016/0212473 A1 | 7/2016 | Zhuang et al. | |
| 2018/0212882 A1* | 7/2018 | Phillips | H04N 21/6168 |
| 2018/0294941 A1 | 10/2018 | Chapman et al. | |
| 2019/0069039 A1* | 2/2019 | Phillips | H04N 21/64738 |
| 2019/0166013 A1 | 5/2019 | Shaikh et al. | |
| 2021/0152386 A1* | 5/2021 | Chari | H04L 41/40 |
| 2022/0053491 A1 | 2/2022 | Sevindik et al. | |
| 2022/0078806 A1 | 3/2022 | Sevindik et al. | |

OTHER PUBLICATIONS

CableLabs, DOCSIS 3.0, The road to 100 Mbps, Greg WhitePrincipal Architect, 30 pages.
CableLabs, Driving Gigabit Speeds: From Lab to Consumer, Contents, Fall 2018. https://www.cablelabs.com/insights/driving-gigabit-speeds-from-lab-to-consumer , pp. 1-36.
CableLabs Technical Report CM-TR-MHA-V02-081209, 2008.
CableLabs Technical Report CM-TR-R-MACPHY-V01-150730.
Cisco Live, What you make possible, Architectures for new services overCable, John Knox, BRKSPG-2016, 75 pages.
Data-Over-Cable Service Interface Specifications, DOCSIS® 4.0, MAC and Upper Layer Protocols Interface Specification, CM-SP-MULPIv4.0-I01-190815, Issued, 2019, pp. 1-953.
Data-Over-Cable Service Interface Specifications, DOCSIS® 4.0, Physical Layer Specification, CM-SP-PHYv4.0-I01-190815, Issued, 2019, pp. 1-102.
DOCSIS 3.1.
Introduction to DOCSIS 3.0, by Byji Pularikkal, CiscoSystems Inc., 100 pages.
Video Over DOCSIS (VDOC) Tutorial, by Byju Pularikkal, Jeff Riddel Cisco Systems Inc., 81 pages.

* cited by examiner

| Return split end (MHz) | Diplex Region (MHz) | Forward spectrum start (MHz) | Forward spectrum available (MHz) | Ration of downstream to upstream capacity |
|---|---|---|---|---|
| 204 | 54 | 258 | 1,536 | 7:1 |
| 300 | 78 | 378 | 1,416 | 5:1 |
| 396 | 102 | 498 | 1,296 | 3:1 |
| 492 | 120 | 612 | 1,182 | 2:1 |
| 588 | 150 | 738 | 1,056 | 1.7:1 |
| 684 | 174 | 858 | 936 | 1.3:1 |

FIG. 3C (Prior Art)

APPARATUS AND METHODS FOR OPTIMIZING CAPACITY IN WIRELINE CABLE NETWORKS WITH VIRTUAL SERVICE GROUPS

PRIORITY

This application is a continuation of, and claims priority to, co-owned and co-pending U.S. patent application Ser. No. 16/986,131 of the same title filed on Aug. 5, 2020, and issuing as U.S. Pat. No. 11,533,227 on Dec. 20, 2022, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireline devices, and specifically in one exemplary aspect to methods and apparatus for establishing service groups within a Hybrid Fiber-Coaxial (HFC) network.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, etc. The nodes 113 convert the optical domain signals to RF signals typically in the range of 42-750 MHz for downstream transmission, and likewise convert RF domain signals to optical for upstream data in the range of 0-42 MHz (see FIG. 3A discussed below). Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

DOCSIS

In the HFC network headend 102 (see FIG. 2), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components (not shown), including upstream and downstream transceivers, MAC schedulers, QoS functions, security/access authentication, etc.

Another key component in the headend 102, is the Edge QAM modulator (EQAM) 205. The EQAM receives e.g., an IP unicast or multicast MPEG transport stream packet over a GigE (Gigabit Ethernet) interface, and produces transport stream on one or more RF channels for transmission over the HFC distribution network 221. The EQAM can also perform other functions such as re-stamp of Program Clock Reference (PCR) timestamps such as for de-jitter processing. Output from the EQAM 205 is combined with video signals (e.g., SDV, analog, etc.) for downstream transmission by the combiner logic 207.

DOCSIS 3.1 and 4.0—

DOCSIS 3.1 brought many fundamental changes to the data-over-cable technology. DOCSIS 3.1 introduced Orthogonal Division Multiplexing (OFDM) as the new PHY layer modulation technology. In OFDM technology, the data is converted from serial to parallel, and transmitted on multiple orthogonal carriers simultaneously. Using the orthogonal multi-carrier concept of OFDM modulation improves the downstream and upstream throughput significantly, and reduces the receiver complexity in the CM and CMTS. Furthermore, bounding narrow band subcarriers in OFDM allows creation of wide band channels from 24 MHz to 192 MHz, moving away from legacy 6 MHz (or 8 MHz) channels of the type used in traditional DOCSIS 3.0/Euro-DOCSIS deployments (see FIG. 3A, wherein the typical DOCSIS 3.0 allocation 300 includes broadband spectrum 304 at a frequency above the spectrum 302 used for broadcast television, SDV, VoD, and other traditional "video" services). Spectrum utilization is also increased, up to approximately 1.2 GHz. FIG. 3B is a simplified graphical representation of DOCSIS 3.1 spectrum allocations; note that traditional DOCSIS 3.0 and QAM technology (i.e., non-OFDM-based modulation) can be used alongside the newer OFDM-based modulation schemes.

Another feature introduced in DOCSIS 3.1, is the Low Density Parity Check Code (LDPC) in upstream and downstream to optimize efficiency, provide robustness against narrow band interferers, and burst errors. The LDPC decoding efficiencies ostensibly increase the Signal-to-Noise ratio (SNR), allowing to use higher modulation for upstream and downstream. Prior to DOCSIS.31, the highest order modulation to allow reliable transmission were 64-QAM for upstream, and 256-QAM for downstream. Due to the LDPC error correcting efficiencies, the DOCSIS 3.1 standard supports 4096-QAM in downstream, and 1024-QAM in upstream, allowing the data transmission speed closer to the theoretical limits.

FIG. 3C is a tabular representation of frequency bands associated with prior art cable systems including broadband (DOCSIS 4.0). DOCSIS 4.0, which is the latest specification for data transmission over cable as of the date of this writing, leverages the DOCSIS 3.1 technology to expand the downstream and upstream spectrum to use full spectrum available for cable network (5 MHz to approximately 1.8 GHz), which is about 600 MHz more than the 1.2 GHz available under DOCSIS 3.1. The Extended Spectrum DOCSIS (EDX) is designed to work over existing cable infrastructure.

Full Duplex (FDX), another feature introduced in DOCSIS 4.0, will allow upstream and downstream traffic to occupy the same part of spectrum, thus doubling the throughput by using the existing HFC network characteristics.

DOCSIS 4.0 defines physical service groups (SG) as follows. In an HFC network, all the CMs connected to the same fiber nodes, are allocated to the same channels. Moreover, each fiber node has a different set of upstream and downstream channels that communicate with it. Thus, in an HFC network, a Cable Modem SG (CM-SG) corresponds to the channels reaching a single fiber node, and the term CM-SG can generally be considered synonymous to a fiber node.

A Downstream SG (DS-SG) is defined as the complete set of CMTS downstream channels that are received by a CM. A CM is reached by a single DS-SG, which represents a unique combination of RF channels. A DS-SG maybe assigned to multiple fiber nodes. A DS-DG is a set of channels defined by topology and physical location of fiber nodes.

An Upstream service group (US-SG) is the complete set of channels in CMTS that may receive data from a CM. A US-SG is defined only by the physical combination of the upstream RF channel from CMs. In the case the upstream fiber channel from different fiber nodes are not combined, each fiber node corresponds to a single US-SG.

CM-SG, DS-SG, and US-SG are physical service groups, and are defined by the topology configuration of CMTS and fiber nodes.

Furthermore, DOCSIS 4.0 defines a MAC Domain CM SG (MD-CM-SG) as the set of downstream and upstream channels from the same MAC domain, which reach a CM. An MD-CM-SG corresponds to general load balancing group because it forms a set of channels among which a non-bounding CM can be moved while remaining registered in the same MAC domain.

Unaddressed Issues—

Although DOCSIS 3.1 and 4.0 specifications provide solutions to enhance data rates, robustness and efficiencies significantly, there are still limitations (e.g., limited spectrum, number of users, and legacy infrastructure) in existing network deployments that prevent the users from reaching the theoretical speed promised in the specifications, even where such technology is deployed. For instance, as the number of the users in an existing HFC network topology increases, the (physical) service groups become more congested. Since each SG has a limited capacity due to its installed infrastructure, as the number of users increase, the available data rate per-user decreases. Therefore, the users may experience slower broadband speeds, particularly during the peak hours.

Furthermore, as described previously, the users are assigned to an SG based on physical location, where each SG is allocated to a frequency band. Therefore, in some scenarios where the frequency band allocated to an SG is crowded, the new users located within the service area of that SG cannot be allocated to that service group. In some other scenarios, the frequency band(s) allocated to the SG may be exposed to interference or signal loss due to attenuation (e.g., at the far ends of the coaxial distribution runs), and therefore some CMs located under the service area of the SG receive differentiated data rates, such as where a CM with poor signal quality for whatever reason can only sustain a lower MCS (modulation and coding scheme) level or tier due to low SNR.

Another issue relating to deployment of enhanced data over cable solutions relates to infrastructure upgrade. Specifically, a complete "tear-out" and replacement of infrastructure (e.g., cable, fiber, nodes, amplifiers, etc.) that can support expanded frequency ranges consistent with new technologies such as DOCSIS 3.1 and 4.0 is both very costly and very time-consuming. This type of approach is especially problematic for many more "pragmatic" network operators who, for whatever reason, do not desire to undergo such radical infrastructure replacement and associated CAPEX, including the potential for customer service disruptions. Generally, more progressive or incremental changes in capability and infrastructure are better tolerated by the network operator's customer base (as contrasted with wholesale or step-changes in capability, user equipment configurations, user interfaces and menus, and other customer-facing aspects). Such incremental approach also advantageously allows the CAPEX to be spread out and amortized over time, and any incipient technological issues can be identified and corrected before mass-deployment of the new technology occurs.

Technology incompatibility issues are also a salient consideration. For example, if extant customer equipment such as legacy CM devices are utilized in conjunction with upgraded network infrastructure, incompatibilities and/or undesired operating results may occur. For instance, if the full range of operation RF spectrum utilized by the upgraded infrastructure exceeds the capabilities of the CM (e.g., the CM tuner can only operate to say 1 GHz, whereas the spectrum available on the network is to 1.2 GHz), the CM may be unable to correctly respond to or utilize messaging sent from the CMTS, and effectively return an error condition or other anomalous behavior. Alternatively, other algorithms such as those performing load balancing between RF channels may be adversely affected; e.g., the algorithms may attempt to balance load between an accessible and inaccessible portion of the RF spectrum, thereby producing anomalous results.

Accordingly, based on the foregoing, improved apparatus and methods are needed to, inter alia, both (i) enable optimized delivery of high data rate services, and (ii) enable leveraging of extant network infrastructure such that upgrades in service capabilities and technology can be performed in a progressive manner, so as to maintain service continuity and allow for a desired rate of CAPEX investment.

Ideally, such improved apparatus and methods would also support flexible allocation of existing and newly added CMs to various SGs within the infrastructure, such as based on the availability of spectrum within those SGs, or to alleviate overcrowding of the SGs.

SUMMARY

The present disclosure addresses the foregoing needs by providing, inter alia, methods and apparatus for providing enhanced service via virtual service grouping for e.g., cable modems in an HFC network In a first aspect of the disclosure, a computerized apparatus configured for operation within a managed data distribution network is described. In one embodiment, the apparatus comprises: network interface apparatus configured for exchanging data with a data network; processor apparatus in data communication with the network interface apparatus; and storage apparatus in data communication with the processor apparatus and comprising a storage medium, the storage medium comprising a at least one computer program.

In one variant, the at least one computer program is configured to, when executed on the processor apparatus, cause the computerized apparatus to: receive data from at least one modem apparatus in data communication with the managed data distribution network, the received data relating to a configuration of the at least one modem apparatus; use at least the received data to evaluate to which of a plurality of virtual service groups the at least one modem apparatus should be allocated; based at least on the evaluation, cause allocation of the at least one modem apparatus to only one of the plurality of virtual service groups; and cause transmission of configuration data to the at least one modem apparatus, the configuration data causing the at least one modem apparatus to selectively utilize only the one virtual service group for at least a period of time.

In another variant, the computerized apparatus further includes a plurality of modulator apparatus configured to generate waveforms within respective frequency bands associated with respective ones of the plurality of virtual service groups. In one implementation, at least one of the plurality of modulator apparatus is configured to generate both QAM (quadrature amplitude modulation) waveforms and OFDM (orthogonal frequency division multiplexed) waveforms within a respective frequency band associated with one of the plurality of virtual service groups.

In a further variant, the data received from the at least one modem apparatus comprises data relating to: (i) a highest DOCSIS version which the at least one modem apparatus supports, and (ii) at least one frequency range which the at least one modem is capable of operation within.

In yet another variant, the plurality of virtual service groups each comprise groups associated with one or more particular frequency bands supported by the infrastructure of the managed data distribution network, and a first of the one or more particular frequency bands supported by the infrastructure of the managed data distribution network comprises a first legacy frequency band, and a second of the one or more particular frequency bands comprises an expansion or upgrade band.

In one implementation thereof, the managed data distribution network comprises a hybrid fiber coax (HFC) cable network; the first legacy frequency band comprises a band between approximately 366 MHz and 750 MHz; and the expansion or upgrade band comprises a band between approximately 750 MHz and 1.2 GHz.

In another embodiment, the computerized apparatus comprises a RMD (Remote MAC Device), and the network interface apparatus comprises a digital optical network interface.

In a further embodiment, the computerized apparatus comprises a headend-based cable modem termination system (CMTS), and the network interface apparatus comprises an analog optical network interface.

In another aspect of the disclosure, a method of allocating spectrum to a plurality of premises devices in a managed network architecture. In one embodiment, the method comprises: forming a first virtual service group (vSG), and associating data channels in a first frequency band to the first vSG; forming a second vSG, and associating data channels in a second frequency band to the second vSG; allocating each of the plurality of premises devices to either the first vSG or the second vSG, but not both; monitoring data utilization within the first and the second frequency bands; and optimizing subsequent ones of the allocations of premises devices to the first or second vSGs based at least in part on the monitoring.

In one variant of the method, the allocating comprises allocating premises devices capable of operating within either the first or second frequency bands only to the first vSG. The method may further include disabling one or more load balancing features associated with the premises devices capable of operating within either the first or second frequency bands.

In another variant of the method, the optimizing subsequent ones of the allocations of premises devices to the first or second vSGs based at least in part on the monitoring comprises selectively causing allocation of each of the subsequent ones to a respective one of the first or second vSGs based on then-existing load associated with the first and second frequency bands.

In a further variant, the optimizing subsequent ones of the allocations of premises devices to the first or second vSGs based at least in part on the monitoring comprises selectively causing allocation of each of the subsequent ones to a respective one of the first or second vSGs based on planned future upgrades to at least a portion of the managed network architecture.

In yet another variant, the managed network architecture comprises a hybrid fiber coax (HFC) architecture; and the selectively causing allocation of each of the subsequent ones to a respective one of the first or second vSGs based on planned future upgrades to at least a portion of the managed network architecture comprises selectively causing allocation of subsequent ones of the premises devices associated with the at least portion to the first vSG only after the upgrade to the at least portion has been completed. For example, the at least portion may comprise a portion of coaxial cable infrastructure within the HFC architecture.

In another variant, the managed network architecture comprises a hybrid fiber coax (HFC) architecture; the associating data channels in the first frequency band to the first vSG comprises associating the data channels to an expanded capability frequency band; and the associating data channels in the second frequency band to the second vSG comprises associating the data channels to a legacy frequency band.

In another aspect of the disclosure, computerized premises modem apparatus configured for operation within a managed data network is described. In one embodiment, the apparatus comprises: first network interface apparatus configured for exchanging data with the managed data network; second network interface apparatus configured for exchanging data with a premises data network; processor apparatus in data communication with the first and second network interface apparatus; and storage apparatus in data communication with the processor apparatus and comprising a storage medium, the storage medium comprising at least one computer program.

In one variant, the at least one computer is configured to, when executed on the processor apparatus, cause the computerized apparatus to: transact data with at least one network apparatus in the managed data network, at least a portion of transacted data relating to a configuration of the at least one premises modem apparatus; and receive configuration data from the network apparatus, the configuration data causing the at least one modem apparatus to selectively utilize only one of a plurality of virtual service groups associated with the managed data network for at least a period of time.

In one implementation, the managed data network comprises a hybrid fiber coax (HFC) cable network; the first network interface apparatus comprises a radio frequency modem apparatus configured to operate within multiple frequency bands of the HFC cable network; and the selective utilization of the one virtual service group comprises selective utilization of only an added frequency band associated with the managed data network. The at least one computer program may further be configured to, when executed on the processor apparatus, cause the computerized apparatus to read the received configuration file upon a reboot event.

In another implementation, the selective utilization comprises causing the computerized modem apparatus to (i) tune the first network interface apparatus to the added frequency band; and (ii) invoke modem negotiation protocols with the network apparatus to establish data service for the computerized modem apparatus using at least portions of the added frequency band.

In a further implementation, the multiple frequency bands of the network comprise (i) a first band utilizing only a first type of modulation scheme; and (ii) a second band utilizing both the first type of modulation scheme and a second type of modulation scheme different from the first type.

In another aspect of the disclosure, methods and apparatus for delivery of sub-bands to different premises devices in a network are described. The different premises devices are categorized to belong to virtual groups (e.g., vSG1 corresponding to an added or expanded capability frequency band, and vSG2 corresponding to legacy bands).

In another aspect, a network architecture configured to support operation of multiple cable modems in multiple vSGs is disclosed. In one embodiment, the architecture includes: a headend and one or more distribution nodes, the distribution nodes configured to transmit radio frequency (RF) waveforms onto a wireline (e.g., coaxial) medium of a network, some of the RF waveforms being orthogonal frequency division multiplex (OFDM) modulated and some being QAM modulated.

In another aspect of the disclosure, a controller apparatus for use within a hybrid fiber/coaxial cable distribution network is described. In one embodiment, the controller apparatus is configured to obtain data associated with a plurality of CM apparatus within the network, and evaluate the obtained data in order to support optimal allocations of each of the CMs to vSGs formed within the network. In one variant, the controller apparatus includes computerized logic configured to execute within a node or headend device of an HFC network, such as a CMTS or RMD or RPD.

In another aspect, a computerized access node implementing one or more of the foregoing aspects is disclosed and described. In one embodiment, the access node includes a wireline interface capable of data communication with user devices (e.g., enhanced CMs as well as legacy CMs).

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, methods for allocating the end users to virtual service groups are provided. The method dynamically allocates users to the service groups based on the availability of spectrum in each service group, and the ability of each user's device (e.g., CM) to access that portion of the spectrum.

In a further aspect, a method of optimizing traffic within a network structure is disclosed. In one embodiment, the network includes an HFC cable network, and the method include: (i) configuring a downstream frequency band 1; (ii) configuring a downstream frequency band 2; (iii) sending data relating to the configured frequency bands 1 and 2 to the user premises devices, and (iv) performing a ranking process to allocate the user premises devices to frequency band 1 or 2.

In another aspect, a method of scheduling (e.g., deferring) improvements within a network infrastructure is disclosed. In one embodiment, the method includes selectively offloading individual ones of in-service modems operating within the network to a designated portion of an operating spectrum within an upgraded or improved portion of the network so as to reduce load and necessity to upgrade extant modems and infrastructure servicing them. In one variant, upgraded CMs within a cable plant (i.e., capable of operation in two or more frequency ranges associated with two or more respective vSGs) are selectively off-loaded to a higher-frequency one of the vSGs so as to reduce loading on the legacy (lower frequency) vSG, thereby obviating, or at least deferring, upgrade of the legacy infrastructure/CMs.

In another aspect, a method of implementing improvements within a network infrastructure is disclosed. In one embodiment, the method includes selectively upgrading infrastructure within the network from a source side to a consumption or served side in sequence, and migrating user CMs in each successive upgraded so as to reduce load and necessity to upgrade extant modems and infrastructure servicing them. In one variant, upgraded CMs within a cable plant (i.e., capable of operation in two or more frequency ranges associated with two or more respective vSGs) are selectively off-loaded to a higher-frequency one of the vSGs so as to reduce loading on the legacy (lower frequency) vSG, thereby obviating, or at least deferring, upgrade of the legacy infrastructure/CMs.

In another aspect of the disclosure, methods and apparatus for grouping devices such as modems based on data rate or related parameters (e.g., modulation and coding scheme, FEC, modulation order, etc.) are described. In one embodiment, the methods and apparatus allow for vSG-based grouping by modem performance or type so that not only can a vSG be allocated based on service flow type, but also by capability/speed/DOCSIS type. In one such variant, three (3) different vSGs are created, corresponding to "fast," "medium," and "slow" device capabilities.

These and other aspects shall become apparent when considered in light of the disclosure provided herein.

BRIEF DESCRIPTION OF THE DRAWINGS

FIG. 3C is a tabular representation of frequency bands associated with prior art cable systems including broadband (DOCSIS 4.0).

Figure 1:
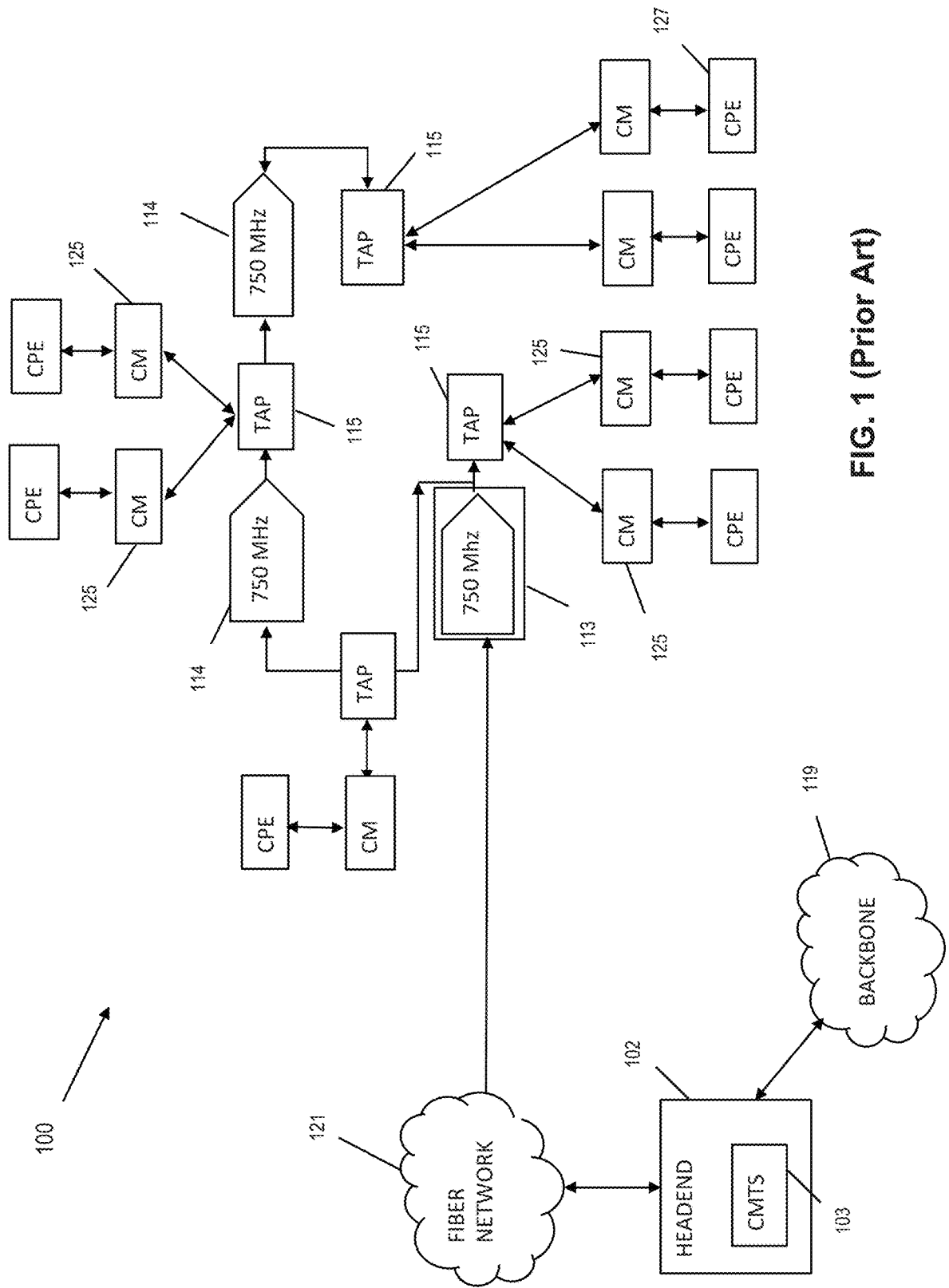
FIG. 1 is a functional block diagram illustrating a typical prior art managed (e.g., cable) content delivery network architecture with fiber and coaxial distribution portions.

All figures © Copyright 2020 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" include, but are not limited to, set-top boxes (e.g., DSTBs), gateways, cable or other modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing, planned or unplanned variants of the Data Over Cable Services Interface Specification, including for example DOCSIS versions 1.0, 1.1, 2.0, 3.0, 3.1, and 4.0, any EuroDOCSIS counterparts thereof, and any subsequent versions or standards originating therefrom or relating to any of the foregoing.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "memory" includes any type of integrated circuit or other storage device adapted for storing digital data including, without limitation, ROM, PROM, EEPROM, DRAM, SDRAM, DDR/2/3/4/5/6 SDRAM, EDO/FPMS, RLDRAM, SRAM, "flash" memory (e.g., NAND/NOR), 3D memory, HBM/HBM2, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, GPUs, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple die or other components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR/NR-U, WAP, SIP, UDP, FTP, RTP/RTCP, H.323, etc.).

As used herein, the term "QAM" refers to modulation schemes used for sending signals over e.g., cable or other networks. Such modulation scheme might use any constellation level (e.g. 16-QAM, 64-QAM, 256-QAM, 1024-QAM, 2048-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax/ay/be, 802.11-2012/2013 or 802.11-2016, as well as Wi-Fi Direct (including inter alia, the "Wi-Fi Peer-to-Peer (P2P) Specification", which is incorporated herein by reference in its entirety).

Overview

In one exemplary aspect, the present disclosure provides improved architectures, methods and apparatus for providing enhanced data services which, inter alia, allow flexibility to operators in allocating users to different spectrum portions, such as for balancing load.

In one embodiment, a managed Hybrid Fiber Coax (HFC) plant infrastructure is used as basis for provision of enhanced DOCSIS-based broadband data services. In one variant thereof, an expanded frequency band available on the cable (e.g., 5 to 1218 MHz) is configured to two different "virtual service groups" or vSGs; i.e., Service Group 1 (750 MHz to 1200 MHz), and Service Group 2 (366 MHz to 750 MHz), wherein different users are allocated to a different group for e.g., downstream data transmission based on commonalities such as type of CM being used, topological location within the HFC distribution network, and/or other considerations such as spectrum availability (or lack thereof) in each of the sub-bands created.

In one configuration, wideband amplifiers and enhanced-capability nodes are used to support delivery to premises devices. These nodes can be built out within selective portions of the network at the pace and scale desired by the operator, without adverse effects on extant CM users.

The disclosed methods and apparatus also advantageously enable a highly uniform user-experience regardless of the geographic location or placement within the network topology, and allows users to be selectively migrated between groups, to some degree irrespective of the topological location within the network. Moreover, legacy user devices (e.g., CMs) within the network can continue to operate alongside upgraded or enhanced CMs configured according to the present disclosure without service interruption or co-existence "artifacts" (such as e.g., unwanted load balancing).

Aspects of the present disclosure further advantageously allow for vSG-based grouping by modem performance or type so that not only can a vSG be allocated based on service flow type, but also by capability/speed/DOCSIS type. Such allocation into e.g., vSGs with the fastest upstream or downstream modulation speed, also offers other operational efficiencies as compared to more heterogeneous mixtures of device capabilities/types.

The improved architecture also advantageously provides a better frequency allocation and spectral efficiency, and thus increases network efficiencies for various target applications and use cases.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned CMTS and CM associated with or supported at least in part by a managed network of a service provider (e.g., MSO), other types of networks and architectures that are configured to deliver digital data (e.g., text, images, games, software applications, video and/or audio/voice) may be used consistent with the present disclosure.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses. Yet other applications are possible.

Moreover, while described primarily in the context of a wireline operator managed network (e.g., HFC network with coaxial cable managed by an MSO), various aspects of the present disclosure may be adapted to other types of networks, including even some unmanaged wireless network infrastructures such as WLANs, wherein groups of client devices may be allocated to virtual service groups according to e.g., unequally shared spectrum.

Other features and advantages of the present disclosure will immediately be recognized by persons of ordinary skill in the art with reference to the attached drawings and detailed description of exemplary embodiments as given below.

Network Architecture—

Figure 4A:
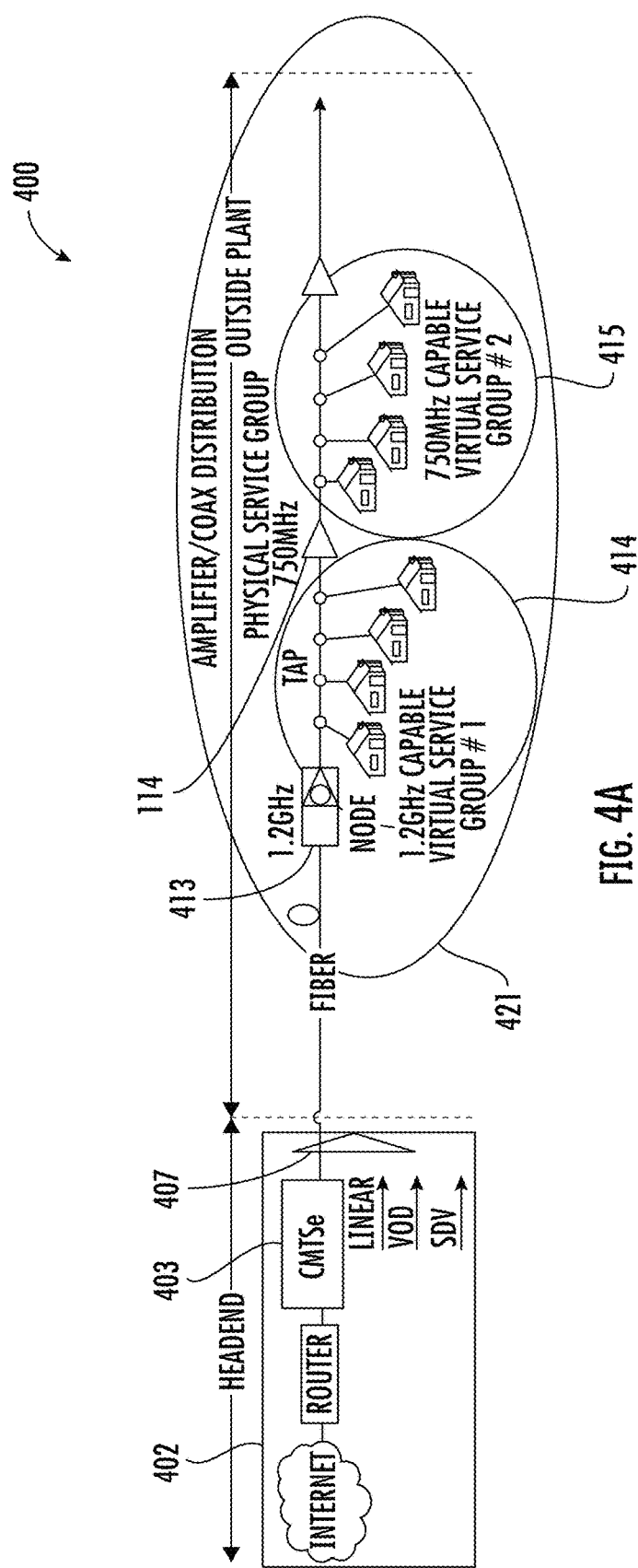
FIG. 4A is a logical block diagram of one embodiment of an HFC network architecture configured according to the present disclosure.

FIG. 4A is a logical block diagram conceptually illustrating one embodiment of an enhanced HFC network architecture configured according to the present disclosure.

Figure 2:
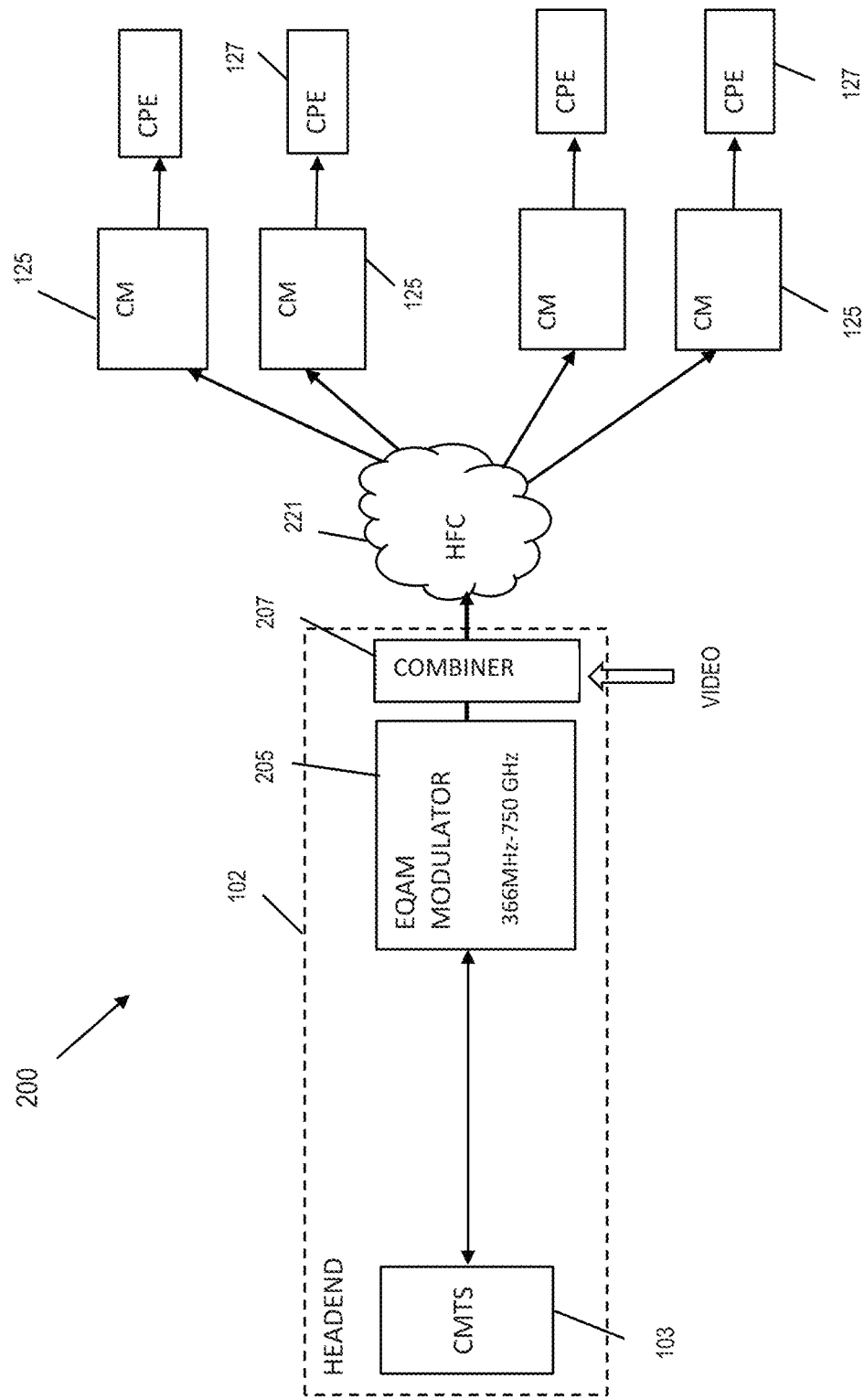
FIG. 2 is functional block diagrams illustrating a typical prior art cable network CMTS/DOCSIS configuration.
Figure 3A:
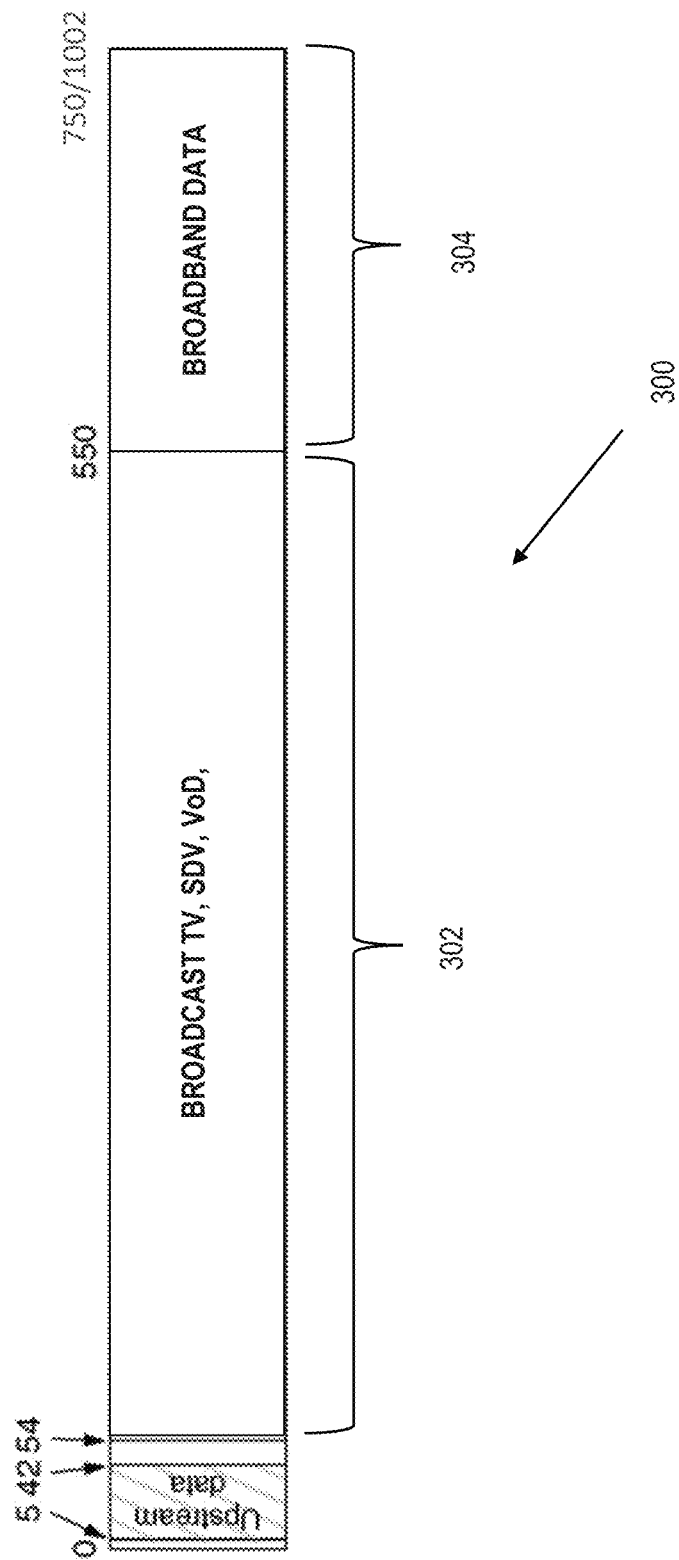
FIG. 3A is a graphical representation of frequency bands associated with prior art cable systems including broadband (DOCSIS 3.0).
Figure 3B:
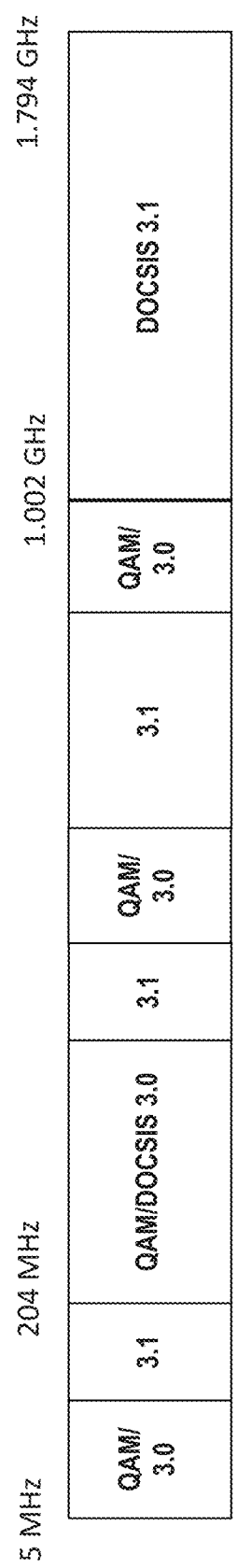
FIG. 3B is a graphical representation of frequency bands associated with prior art cable systems including broadband (DOCSIS 3.1).

As illustrated, the architecture 400 includes one or more headends 402 within the MSO network, and a distribution network such as the exemplary HFC architecture of FIG. 2. The headend 402 is connected to one or more optical nodes or hubs 413 via a fiber link as shown. The headend 402 generally includes Internet connectivity (such as via router/backbone technology of the type described elsewhere herein), and an enhanced CMTS (CMTSe) 403. An optical combiner 407 is used to combine the data (CMTSe) output with other signals such as switched digital video (SDV), linear/broadcast, or VoD, for transmission downstream to users via the HFC infrastructure.

As described in greater detail subsequently herein, the optical node(s) 413 are in one embodiment convert the optical downstream signals to RF domain signals for distribution within the coaxial cable portion 421 of the HFC topology, including at frequencies up to the desired "expanded" or enhanced range of coverage (e.g., up to 1.2 GHz in the illustrated example). Since the underlying RF coaxial cable is capable of operating up to frequencies on the order of 2.0 GHz without debilitating attenuation (the attenuation being generally a function of frequency), extant coaxial cable infrastructure can advantageously be leveraged to provide enhanced data bandwidth without having to replace the cable itself. However, to support such expanded frequencies, some components of the extant legacy (i.e., 750 MHz) plant must be replaced or upgraded, such as amplifiers, taps, and moreover the legacy CMs 125 (see FIG. 1) may not have tuners or other components which would allow them to utilize the expanded portions of the spectrum, and as such the present disclosure also introduces enhanced or expanded-capability CMs (CMe) as described below with respect to FIG. 5. Specifically, most existing installations are limited by hardware (e.g., filters, tuners) so that extended spectrum capability is not possible. There may be some cases (e.g., when increasing operating band from 750 MHz to 1 GHz) where an increased tuner firmware driver may be supplied. However, performance specifications in such scenarios may no longer be met due to e.g., unknown capability in a non-intended design region of operation, poor SNR in that frequency band, unknown or poor filter band edges, tuner frequency error and phase noise, Nyquist sampling inadequacies, etc. Hence, the foregoing "patch" approach is often not optimized even where available.

Figure 4B:
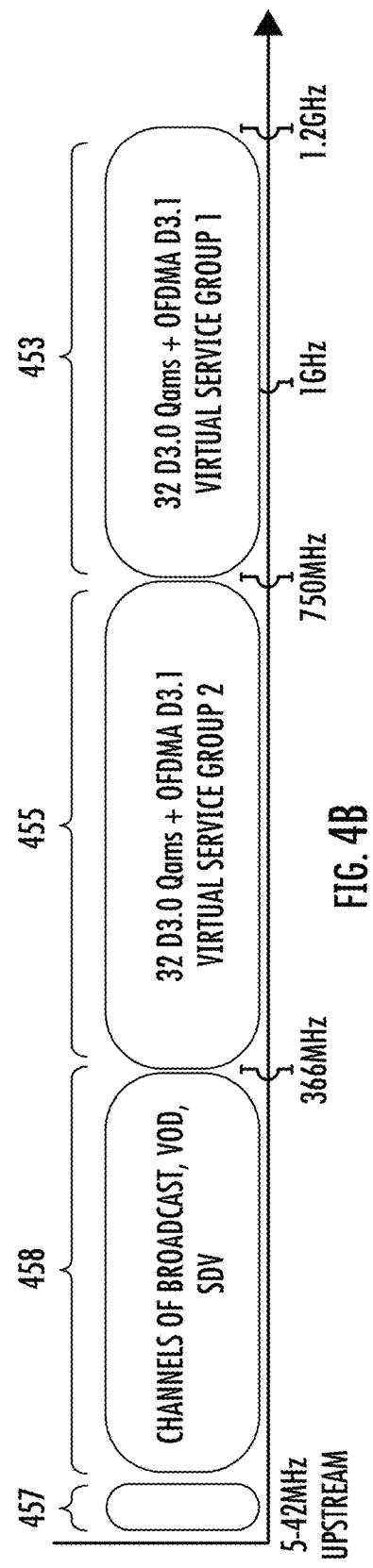
FIG. 4B is a graphical representation illustrating an exemplary embodiment of allocation of frequency channels to virtual service groups (vSGs) according to the present disclosure.

FIG. 4B is a graphical representation illustrating an exemplary embodiment of allocation of frequency channels to virtual service groups (vSGs) according to the present disclosure. As shown in FIG. 4B, portions of the coaxial distribution network 421 are used to form virtual Service Groups (vSG1) 414 and vSG2 415. vSG1 is configured to support downstream frequencies 453 in the range of 750 MHz to 1.2 GHz in this example, and vSG2 is configured to support downstream frequencies 455 in the range of 366 MHz to 750 MHz. The enhanced node 413 converts a portion of the received optical domain signals from the CMTSe 403 to the frequency range of 750 MHz to 1.2 GHz to be used by CMs within vSG1. The node 413 also converts another portion of the received optical signals frequency to the frequency range of 366 MHz to 755 MHz to be used by the CMs within vSG2.

It will be noted that, as described subsequently herein with respect to FIGS. 12-13C, the placement of the node 413 at the upstream portion of the coaxial topology 421 advantageously enables users (CMe devices) within the physical service group served by the node 413 upstream of the next "legacy" amplifier 114 to be included within vSG1, and (i) others non-CMe devices within that portion to be included in vSG2, and (ii) legacy (non-CMe) devices downstream of the next amplifier 114 to be part of a separate vSG (vSG2) operating within a different frequency band.

As illustrated in FIG. 4B, the 5-42 MHz band 457 is used for upstream transmission as in legacy approaches, and the frequency band 43 MHz to 366 MHz 458 is allocated to downstream VOD and SDV, and broadcast channels. Hence, all legacy operations are supported (upstream such as for OOB signaling, VoD, SDV, linear, etc., as well as QAM-based DOCSIS 3.0 within wither vSG1 band 453 or vSG2 band 455), as are newer technologies such as DOCSIS 3.1 OFDM waveforms (again, in either vSG1 band 453 or vSG2 band 455).

Figure 5A:
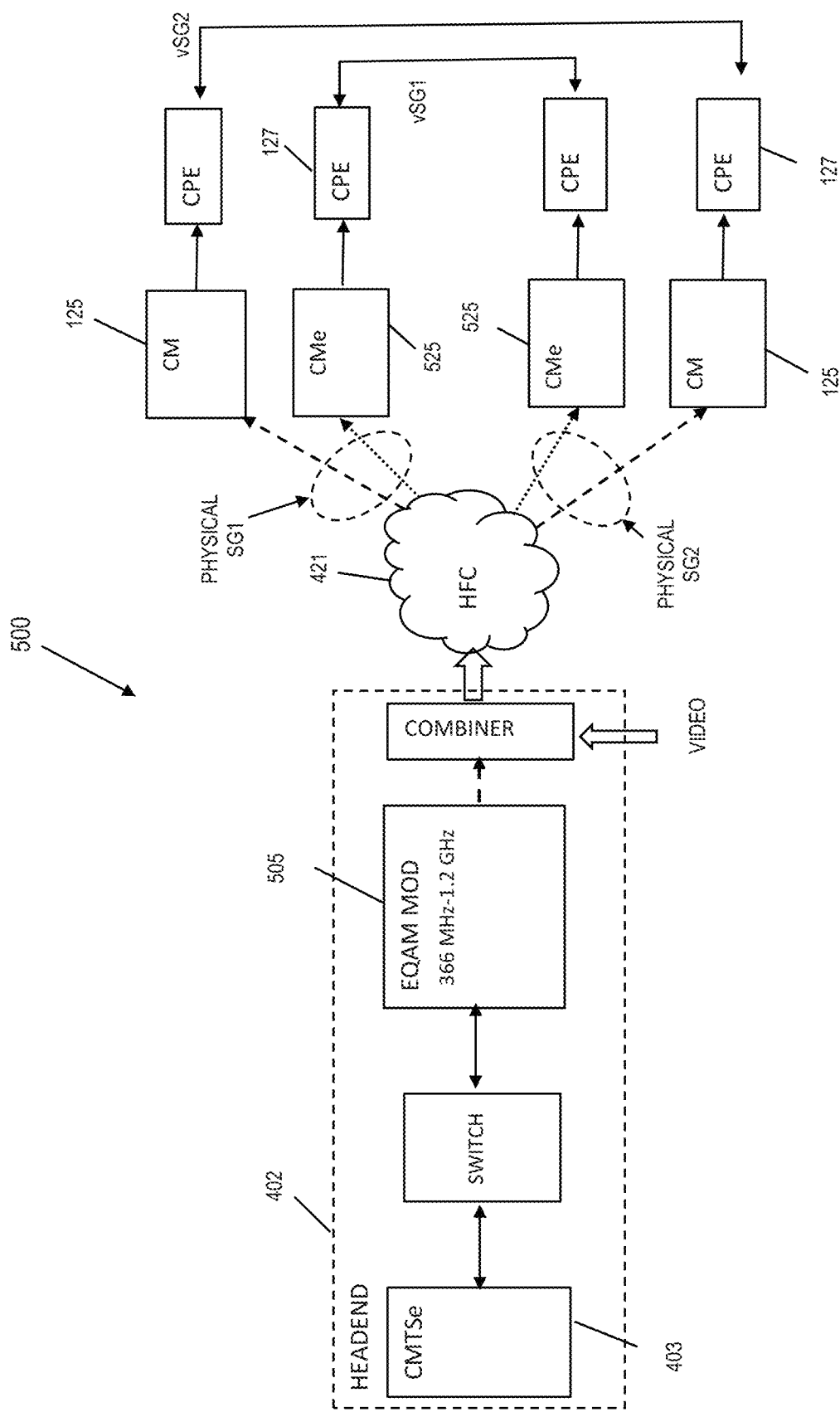
FIG. 5A is a functional block diagram illustrating a first exemplary configuration of an HFC network architecture apparatus according to the present disclosure, with enhanced CMTS (CMTSe) and EQAMs located at a cable system headend.
Figure 5B:
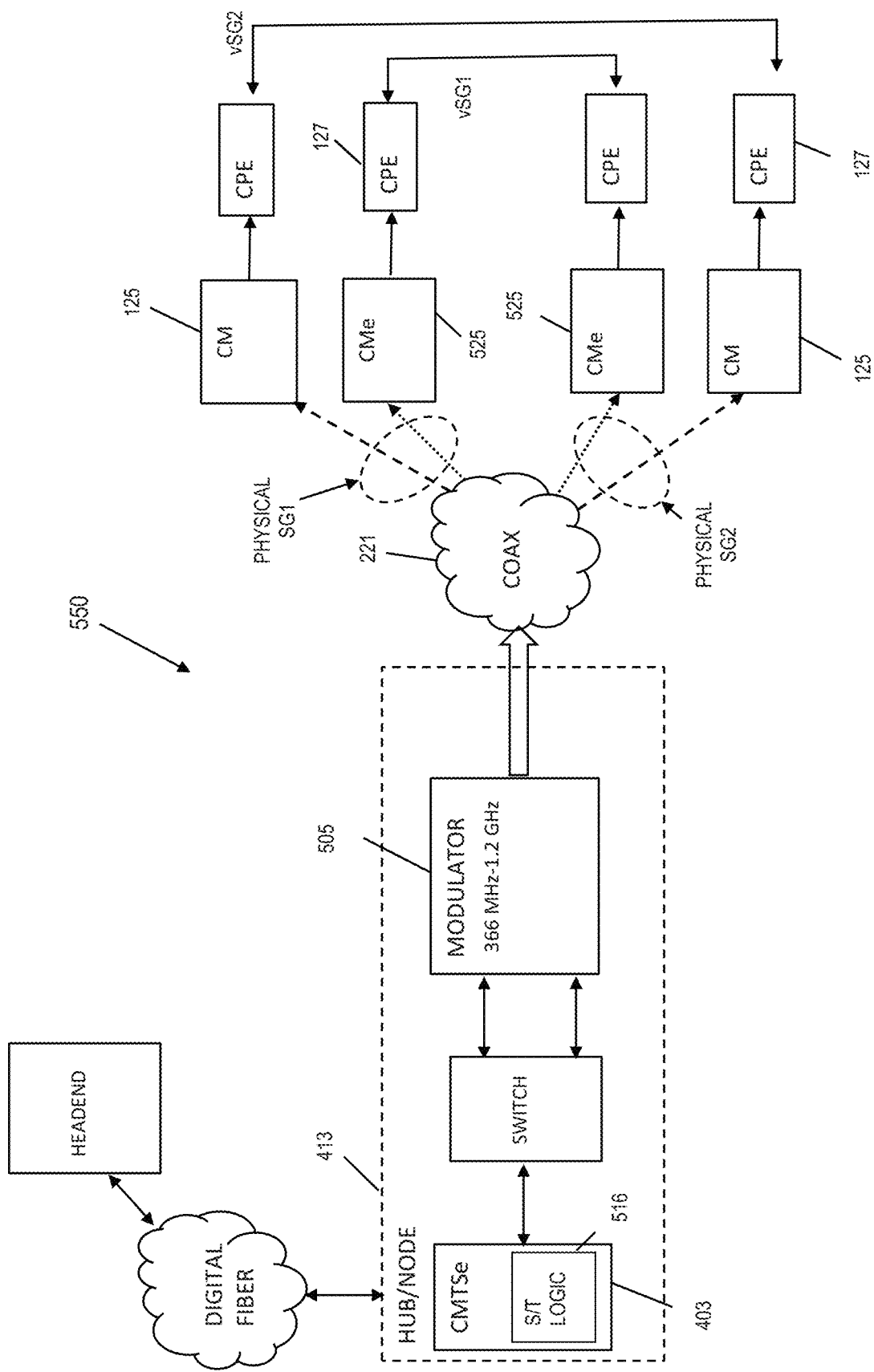
FIG. 5B is a functional block diagram illustrating a second exemplary configuration of an HFC network architecture apparatus according to the present disclosure, with enhanced CMTS (CMTSe) and EQAMs located at a cable system optical node or hub.

Referring now to FIGS. 5A and 5B, various embodiments of the enhanced architecture according to the present disclosure are now described.

As a brief aside, the so-called modular headend architecture (MHA; see e.g. CableLabs Technical Report CM-TR-MHA-V02-081209, which is incorporated herein by reference in its entirety) essentially separates the downstream PHY layer out of the CMTS, and move it to a separate EQAM device. In this architecture, the CMTS transmits data to the EQAM via the Downstream External PHY Interface (DEPI). This architecture was introduced in order to reuse EQAM to modulate both the data bits as MPEG video bits. The upstream receiver is kept in the CMTS in the MHA.

In contrast, another architecture used in implementing headend platforms is the Converged Cable Access Platform (CCAP). In order to increase efficiency, the CCAP integrates the EQAM and CMTS into one platform. In addition, in the CCAP, all the downstream traffic, including DOCSIS and video QAMs are transmitted in a single port. The CCAP unifies the CMTS, switching, routing, and QAM modulator in one unit, so that all data and video are converted in IP packets before conversion to RF signals.

The Remote PHY technology, also known as Modular Headend Architecture Version 2 (MHAV2), removes the PHY from the CMTS/CCAP platform and places it in a separate access point that is interconnected with an IP network. One common location to place the remote PHY is the optical node that is located at the junction of the fiber and coax cable networks.

In the MHAV2 architecture, the CCAP includes two separate components, CCAP core and the Remote PHY Device (RPD). The CCAP core contains a CMTS core for DOCSIS, and an EQAM core for video. The CMTS core contains the DOCSIS MAC, upper layer DOCSIS protocols, all signaling functions, downstream and upstream scheduling. The EQAM core processes all the video processing. Similarly, an RMD (generally analogous to the RPD, but containing the DOCSIS MAC, also colloquially referred to as a "Flex MAC") is also specified; see e.g., CableLabs Technical Re4port CM-TR-R-MACPHY-V01-150730, which is incorporated herein by reference in its entirety.

The RPD/RMD processes all the PHY related function, such as downstream QAM modulators, upstream QAM demodulators, upstream coders, downstream decoders, filtering, time and frequency synchronization, as well as the logic to connect to the CCAP core. One motivation for using such approaches as RPD/RMD is the ability to obviate analog fiber components between the headend and optical nodes, and rather utilize digital optical PHY and interfaces thereby enhancing quality at the nodes.

Hence, it will be appreciated by one of ordinary skill given the present disclosure that the exemplary network architectures described below with respect to FIGS. 5A and 5B may be readily adapted to any of the foregoing models or paradigms (e.g., MHA, MHAv2, etc.), and yet other configurations are possible, those of FIGS. 5A and 5B being merely non-limiting examples.

FIG. 5A is a functional block diagram illustrating a first exemplary configuration of an HFC network architecture apparatus according to the present disclosure, with enhanced CMTS (CMTSe) and EQAMs located at a cable system headend 402. This embodiment leverages existing architectures which utilize a headend-based CMTS and EQAM, yet with further expansion of CMTS and EQAM capabilities. Specifically, as described in detail subsequently herein, the enhanced CMTSe 403 shown includes additional logic which supports (i) collection and analysis of data obtained from various CMs 125 or CMe's 525 within the network, (ii) establishment of two or more vSGs, and (iii) allocation and reconfiguration of CMs/CMe to the established vSGs so as to support one or more operator goals.

As shown, the architecture 500 of FIG. 5A includes the CMTSe 403, as well as switch logic that interfaces the CMTSe with one (or more) EQAMs 505, capable of operation within the two or more created vSGs. Output of the EQAM is combined with video and other signals, and the combined (optical domain) signal transmitted downstream via optical fiber to one or more nodes 413 within the HFC topology (not shown in FIG. 5A) for ultimate delivery to either CM 125 or CMe 525 devices for use by premises CPE (such as e.g., Wi-Fi-enabled routers, PCs, gateways, small cells or femtocells, or other devices) within the served premises. As discussed with respect to FIGS. 4A and 4B, while a given set of CM devices may reside within a common physical SG (e.g., off the same physical tap of the coaxial network), they may be placed in different vSGs as shown in FIG. 5A, based on e.g., their ability to utilize spectrum within a prescribed range (e.g., up to 1.2 GHz for vSG1).

FIG. 5B is a functional block diagram illustrating a second exemplary configuration of an HFC network architecture apparatus according to the present disclosure, with enhanced CMTS (CMTSe) and modulators located at a cable system optical node or hub. In this embodiment, the modulator 505 and CMTSe 403 (which now includes scheduling and timing logic 516) are disposed at the node or hub 413 served by the fiber network as opposed to the headend. In one variant of this architecture 550, the CMTSe, modulator, and other logic may all be combined into a common CCAP RMD device of the type previously described (see FIG. 11).

In the embodiment of FIG. 5B, the modulator 505 may also include both EQAM and OFDM modulation capability. For instance, traditional EQAM capability may be provided for DOCSIS 3.0 only devices within either vSG1 or vSG2, while OFDM modulators (i.e., iFFT, P/S conversion, etc.) necessary to schedule time/frequency resource blocks (RBs) for transmission downstream according to DOCSIS 3.1 protocols may be used to generate waveforms within e.g., vSG1 only.

Methods—

Referring now to FIGS. 6-8C, methods of operating the network infrastructure of with reference to FIGS. 5A and 5B herein are shown and described.

Figure 6:
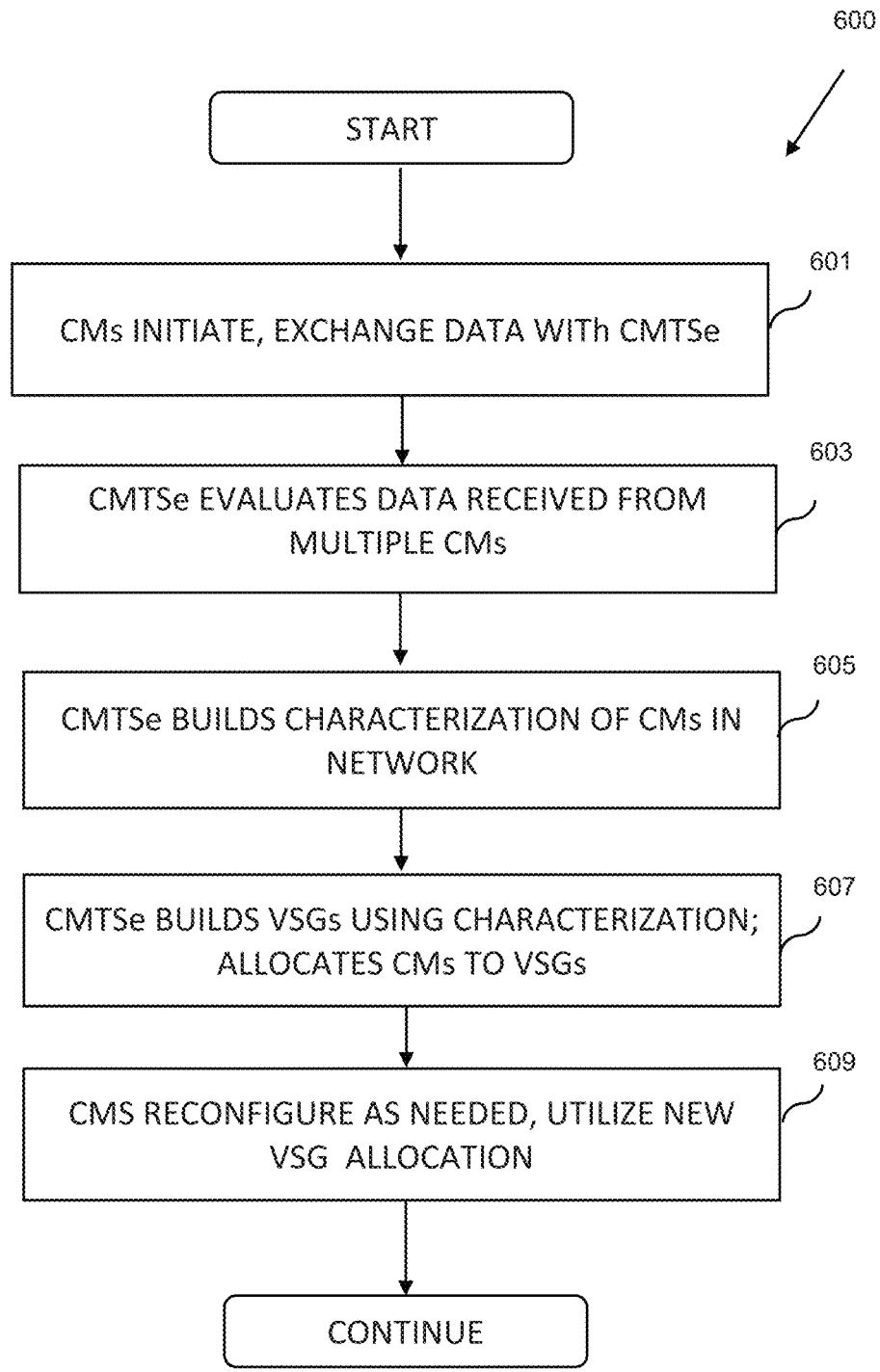
FIG. 6 is a logical flow diagram illustrating one embodiment of a generalized method of configuring virtual service groups according to present disclosure.

FIG. 6 is a logical flow diagram illustrating one embodiment of a generalized method of configuring virtual service groups according to present disclosure. As shown, the method 600 begins with the client device (e.g., CM 125 or CMe 525, referred to generally as "CMs" for purposes of this discussion) being initiated and exchanging data with the CMTSe 403 at step 601. As described below in greater detail, this initiation/exchange is in one embodiment entirely consistent with existing DOCSIS protocols already in place within the network.

Next, per step 603, the CMTSe receives and evaluates the data from the various CMs. As can be appreciated, these steps may happen simultaneously, or over a period of time (e.g., sequentially as new CMs come online, existing CMs are rebooted, etc.), and may occur on a recurring or continual basis.

Per step 605, the CMTSe builds a characterization of the CM "pool" for which it has data, such as via algorithmic analysis as described subsequently herein.

Per step 607, the CMTSe uses the characterization data from step 605 to allocate each of the CMs (or subsets thereof) to a respective vSG for subsequent operation. Each CM can only be allocated to one vSG at any given time (other than perhaps for brief transient periods during "handover"), but CMs may readily be moved or re-allocated between different vSGs. Moreover, not every extant CM need be characterized; the scope of such evaluation/analysis may be specified by the logic of the CMTSe 403 (or even another core or network process such as a schedule or service optimizer or business decision rules engine) such that CMs are allocated/re-allocated only as needed, in "JIT" (just-in-time) fashion, only upon new install, only when bandwidth limitations exist, etc. Likewise, legacy CMs 125 which have firmware which does not support enhanced vSG capability may simply continue operation as normal, with enhanced CMe 525 in effect being "moved around" them within vSG space.

It will also be appreciated that while each CM is allocated to a single vSG at a given time in the illustrated embodiment, one implementation of the disclosure allocates a "fallback" or alternate vSG in case handover or other aspects of vSG operation within a new or target vSG fails for some reason (thereby avoiding stranding of the CM).

Moreover, if so equipped, a given CMe may be configured to operate within both/all vSGs simultaneously if desired by the operator.

Lastly, at step 609, the CMs are reconfigured as required (such as via new configuration file data as described below), such as via a reboot which causes the CM to implement the new file data.

Figure 7A:
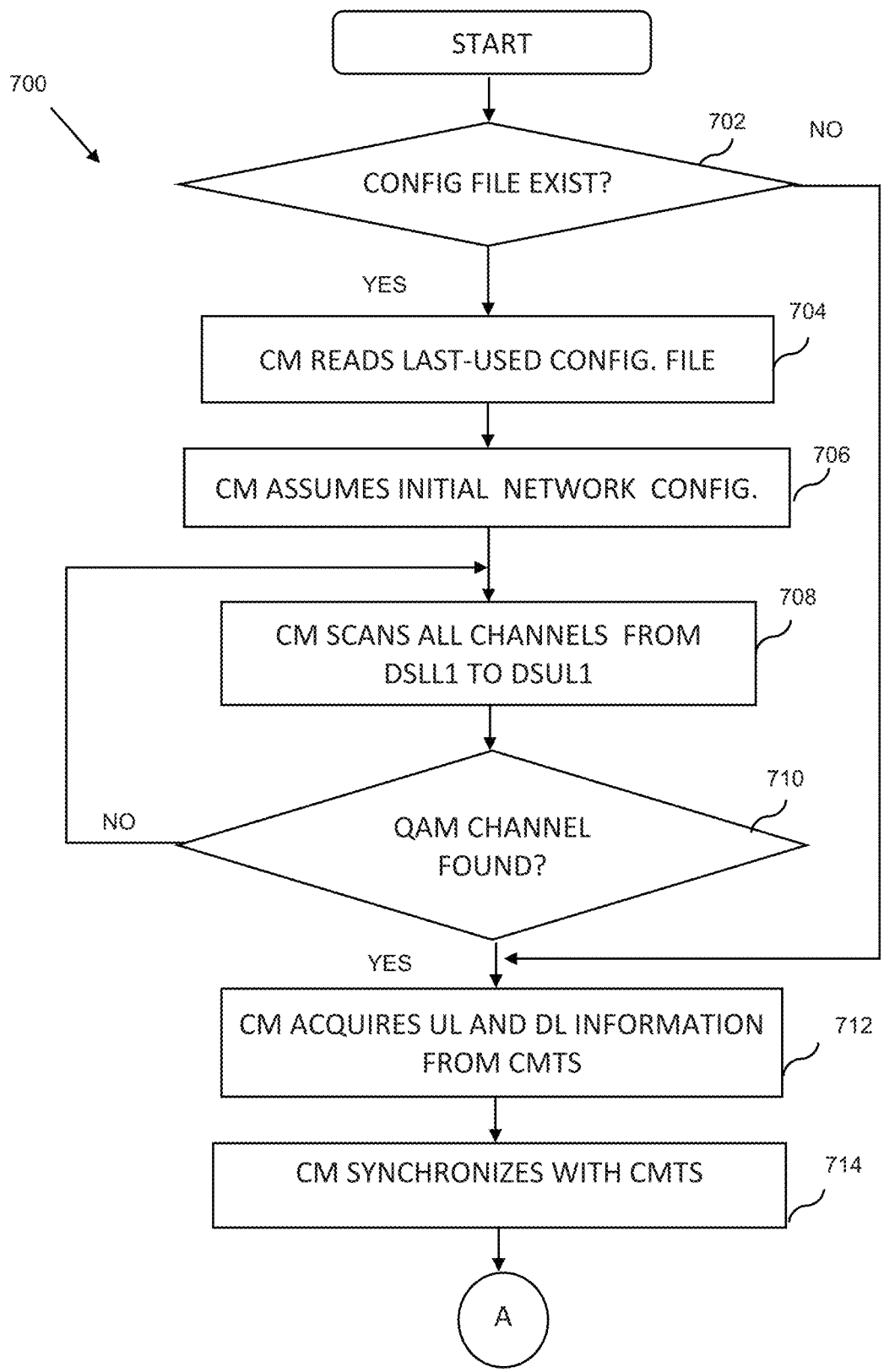
FIGS. 7A-7B are a logical flow diagram illustrating one particular implementation of the method of FIG. 6.
Figure 7B:
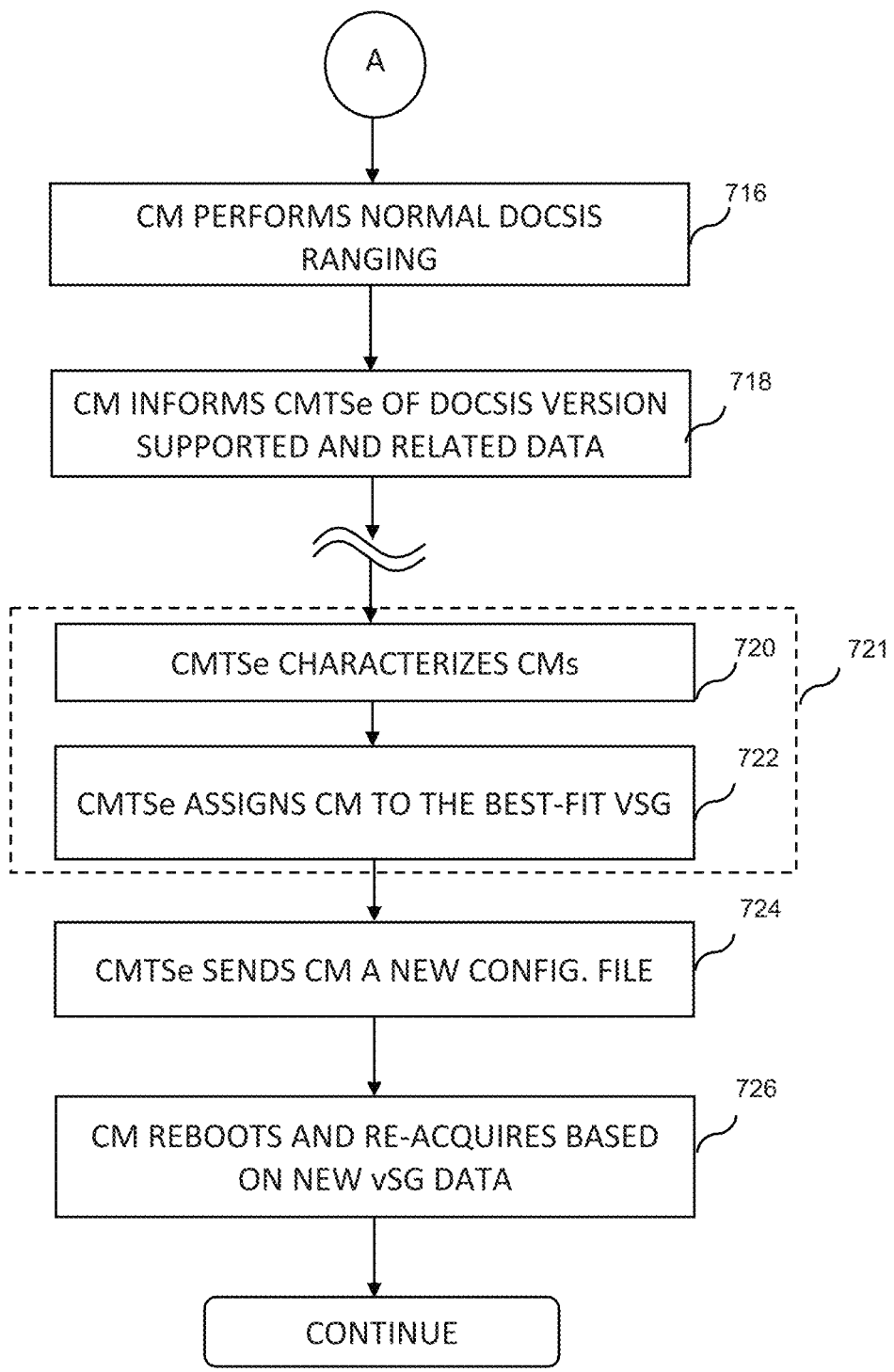

FIGS. 7A-7B are a logical flow diagram illustrating one particular implementation of the method of FIG. 6. It will be appreciated that while described primarily in the context of QAM modulation waveforms, QPSK or other such modulation schemes which may be utilized under e.g., the DOCSIS protocols can be substituted as applicable.

At step 702, a given CM initiates and determines whether a configuration file exists. If the configuration file exists, the CM logic proceeds to step 704, and reads the last-used configuration file.

If no configuration file exists, it proceeds to step 712 discussed below.

At step 706, the CM accesses logic which causes it to assume a prescribed initial network condition. For instance, the CM may include a data structure (LUT, file, etc.) which causes it to assume a "worst-case" scenario, wherein only single-channel operation is supported. As such, the CM uses a default or base-case configuration to start with in this embodiment.

As previously noted, in the exemplary embodiments described herein, the existing or legacy upstream (US) frequency range (5-42 MHz) is maintained for consistency. Similarly, a downstream (DS) frequency range (DSLL1 to DSUL1) outside of the US range is utilized during CM initiation. DSLU1 is the downstream upper limit of frequency band, while DSLL1 is the downstream lower limit of frequency band; both are configured within a look-up table in firmware in this embodiment, although other approaches may be used. As such, the operator can control how wide of a spectrum which the CM examines on its initial scan.

Hence, at step 708, the CM scans all channels for one or more RF-related parameters from the lowest to highest RF channel in the frequency band specified by DSLL1 to DSUL1. For instance, Received RF Level (and/or other parameters such as RxMER, RxSNR, and/or RxMCS (Modulation Coding Scheme)) is/are detected within sub-portions of the scan band to attempt to identify energy correlating to DS QAM transmissions from the CMTS. For example, in one approach, pilot tones are used to detect DOCSIS 3.1 and 4.0 carrier bands, and for DOCSIS 1.0-3.0, the presence of energy followed by cyclic prefix checking during a scan across known EIA QAM channel slots may be used. In some SC (single carrier) QAM and OFDM, messaging may be used (such as where the CMTS broadcasts on one or more downstream channels to the CMs) so the CMs can identify the DOCSIS channel. Yet other approaches will be recognized by those of ordinary skill given the present disclosure.

At step 710, the CM checks if any QAM channel is found. If a QAM channel is found, the modem proceeds to step 712, where it acquires upstream Tx frequency and timing slot information from the CMTSe.

At step 714, the CM synchronizes with the CMTSe using the upstream channel information.

At step 716, the CM performs the normal DOCSIS sounding or "ranging" process to determine downstream signal level, upstream signal level, clock, timing-offset, DHCP and current bounding information from the CMTSe.

At step 718, the CM informs the CMTSe of its highest DOCSIS version (e.g., 1.0, 1.1, 2.0, 3.0, 3.1, or 4.0), as well as data indicative of DSLL1 to DSUL1 frequency range, and upstream USLL1 and USUL1 frequency range. This may be accomplished for instance by the CM accessing its firmware/OS/middleware to determine data stored in memory relating to its firmware version number (e.g., v1.5=DOCSIS 3.1 capable) and its DS/US level values, and transmitting this data to the CMTSe via e.g., a field of information element (IE), descriptor, or other data structure or message protocol. As will be appreciated by those of ordinary skill given this disclosure, existing DOCSIS or other signaling protocols or messages may be readily modified or adapted to transmit such data between the CM and the CMTSe.

Notably, a legacy CM 125 (i.e., non-enhanced) at this juncture of the method will simply enter normal operation with the CMTSe per existing protocols, since it has no programming to forward its DOCSIS version/data or perform the subsequent steps as described below. It in effect defaults to that vSG which encompasses its already-specified range of DL/US frequencies and other capabilities (although it has no cognizance of being in a vSG). As such, steps 720 onward of the method 700 are applicable to enhanced CMs (CMe) 525 only.

At step 720, the CMTSe (or a proxy process therefor) characterizes the various modems according to one or more criteria (which may relate to their DOCSIS version supported, their actual performance data, etc.), and at step 722, the CMTSe assigns the given CM to the "best fit" vSG (e.g., vSG1 or vSG2 in the example of FIGS. 4A and 4B).

As step 724, the CMTSe sends CM a new configuration file including data regarding its vSG allocation (which may be in the form of new DL frequency limits), and this file becomes the new default file for that CM. Note that the same configuration file may be used by and/or broadcast to multiple CM, such as where common configuration of each is desired. In another approach, the vSG allocation data may be contained within the TLV (type, length, value) fields of the MAC domain messaging from the CMTS to direct the modem to the correct frequency set for the target vSG.

Lastly, at step 726, the CM reboots and re-acquires the CMTSe within its allocated vSG frequency band based on the new configuration file data.

In one embodiment of the method 700, the CMTSe continuously maintains the vSG groupings, and keeps them static until a new spectral environment (e.g., a new node or other device expanding spectral range, or a new vSG frequency allocation plan) is added. In the case of any subsequent reboot, the CM uses the new "default" configuration file of step 724 until either: (i) a factory reset occurs, or (ii) a new default configuration file from CMTSe is sent via the downstream channel, or (iii) an unsuccessful series of attempts to acquire the CMTSe has occurred.

It will be appreciated that one benefit from the foregoing implementation of methodology is that CMs may, when capable of operating in vSG1, be immediately removed from vSG2, such as where the bands used by vSG2 are heavily overloaded. Unlike existing DOCSIS solutions, no inter-band (inter-vSG) load balancing will occur, and as such the CMe 525 allocated to vSG1 will no longer present (or at least no add) any burden to the overloaded vSG1 band.

Figure 8:
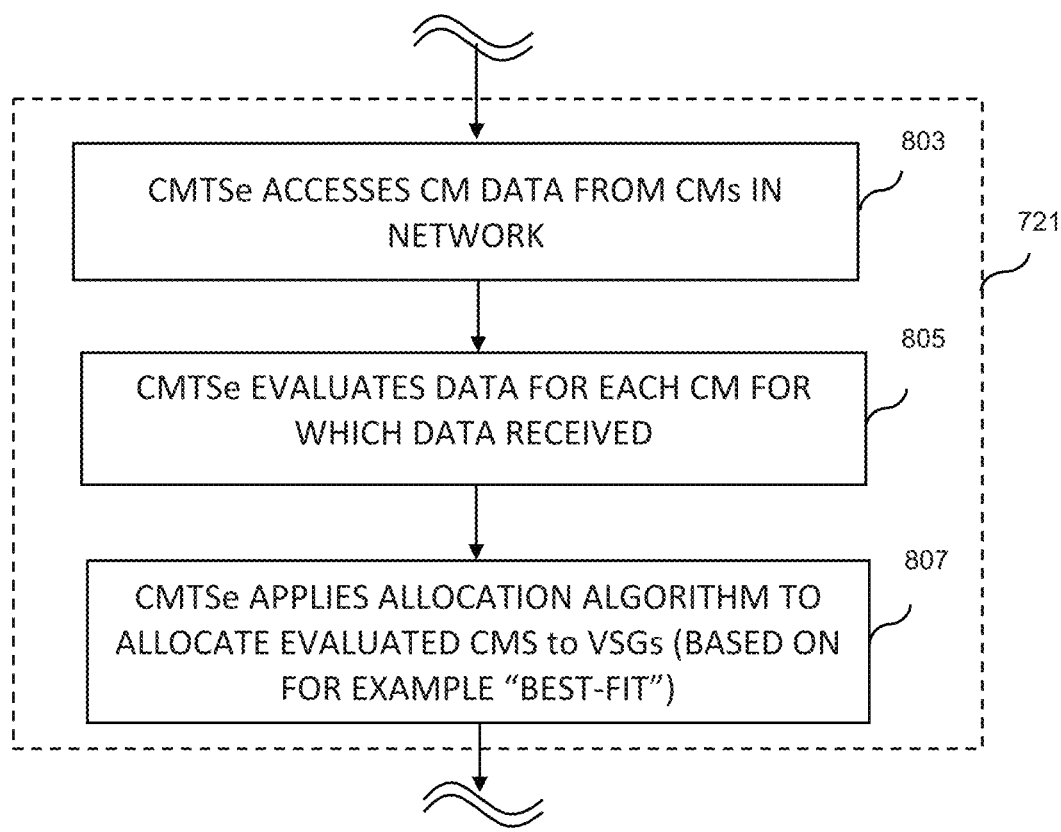
FIG. 8 is a logical flow diagram illustrating one particular implementation of the method of FIGS. 7A-7B.

FIG. 8 is a logical flow diagram illustrating one particular implementation of the method of FIGS. 7A-7B, particularly step 721 (steps 720 and 722) of FIGS. 7A-7B. As shown, per step 803, the CMTSe accesses the acquired data relating to each of the CMs within the network. Note that while this analysis may be based solely on data acquired during that "iteration" of the method 700, historical data as well as data relating to non-responding CMs (e.g., those which have not rebooted or been installed in any recent time) can be accessed via a network database so as to form a more holistic view of all CMs currently in operation within the network as a whole.

Per step 805, the CMTSe logic evaluates the data it has obtained at step 803 for each CM (or designated subsets thereof, as previously described). This evaluation may include e.g., categorization according to spectral capabilities and channel/modulation type (QAM, OFDM), and channel bonding capability as discussed below. In effect, the CMTSe logic builds a profile of each CM (or alternatively group/population slice of CMs, such as those of a common model and from a common manufacturer) to support further allocation to a vSG.

At step 807, the CMTSe utilizes an algorithmic analysis to allocate the various CMs (which may include both CM 125 and CMe 525 devices) to the various created vSGs. For instance, in one approach, the CMTSe includes a ranking engine adapted to use a ranking algorithm to assign any new modem in the network to the best-fit vSG. The ranking algorithm may use e.g., USLL1, USUL1, DSLL1, and DSUL1 information recovered from each modem to determine whether that modem is in fact capable of operation within a prescribed frequency band or sub-band associated with a given vSG.

Figure 8A:
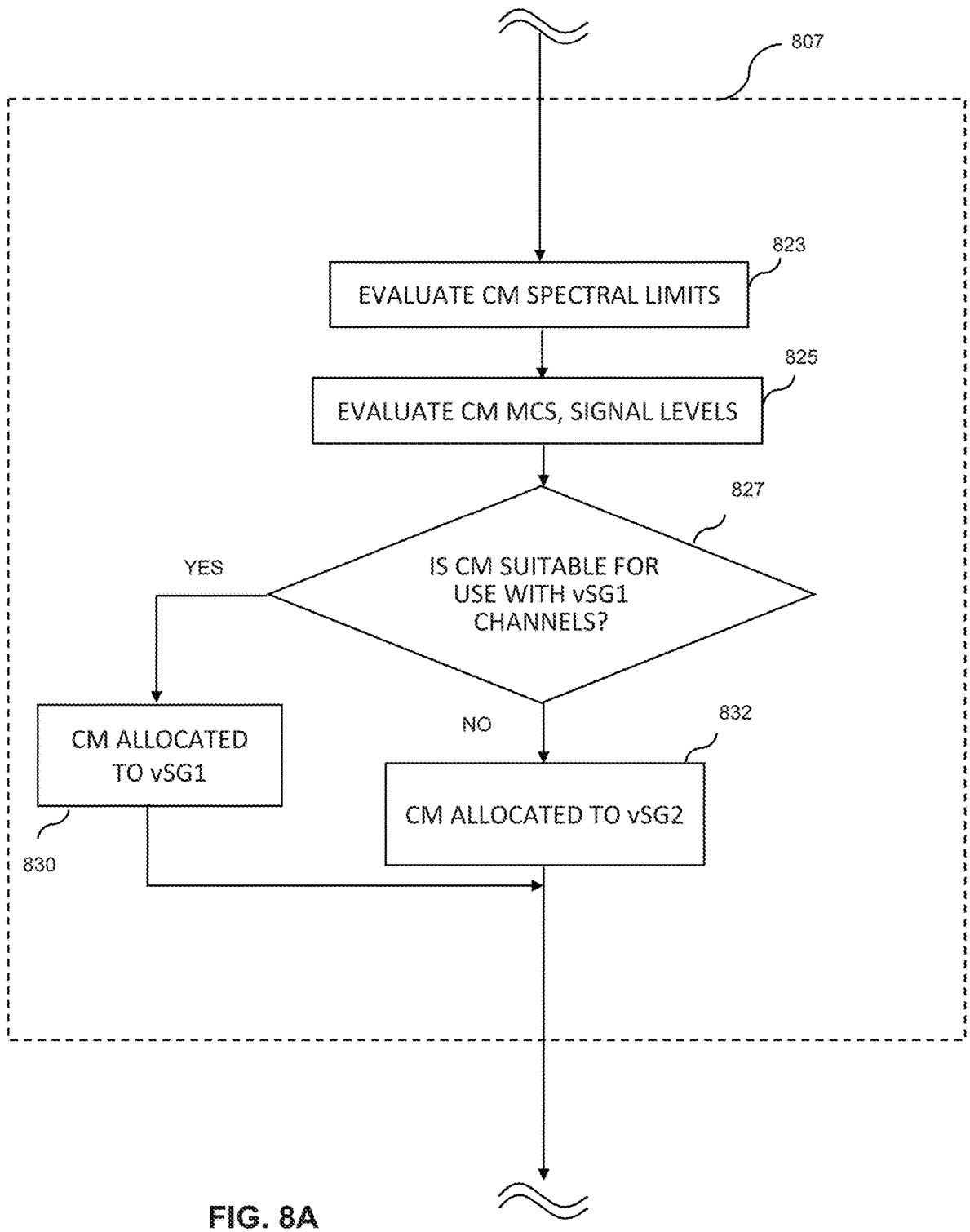
FIG. 8A is a logical flow diagram illustrating a first implementation of the method of FIG. 8, particularly relating to allocation of CMs to different vSGs.

FIG. 8A is a logical flow diagram illustrating a first implementation of the method of FIG. 8, particularly relating to the allocation of particular CMs to different vSGs per step 807. As shown, per step 823, the spectral limits (e.g., DSLL1 and DSUL1) are evaluated to determine the spectral range capability of the device.

Per step 825, the MCS (modulation and coding scheme) data and/or signal levels data (e.g., within the spectral limits of step 823) for that CM is evaluated.

At step 827, the algorithm then determines, based on the gathered data, whether the CM can ostensibly bond to a given channel within a prescribed (e.g., vSG1) frequency range. If so, it is placed into vSG1 per step 830. If not, it is placed into another vSG (e.g., vSG2 455 per FIG. 4B) per step 832.

Note that this initial categorization may also be filtered or adjusted, such as where too many CMe devices 525 are placed in vSG1 (thereby overloading it), and as such some CMe's are put into vSG2 despite being vSG1-capable. Other factors such as maintenance or upgrade outage data, business considerations such as subscriber subscription level or tier, SLA or QoS requirements, historical failure/trouble data (e.g., has that modem had a bad history with frequencies within the vSG1 or vSG2 band, potentially indicating a hardware issue), etc. may also be used in determining final vSG allocation.

Obviously, the process set forth in FIGS. 6-8A may be applied on a per-CM basis; i.e., each CM is evaluated and categorized/allocated to a vSG at any given time, such as when a single new CMe is added to the network by a customer or installer.

It will also be appreciated that while the foregoing embodiments are data-based (i.e., the allocation to a given vSG is based on data relating to frequency limits, DOCSIS version compatibility, etc.), more anecdotal or performance-based metrics can be used as basis for characterization, either alone or in tandem with the data types described above. For instance. in one variant, techniques similar to those used for Profile Modulation Application (PMA) analysis may be used consistent with the present disclosure for characterizing CMs, including obtaining MER (modulation error rate) data as described in CableLabs Technical Report CM-TR-PMA-V01-180530, which is incorporated herein by reference in its entirety. Similarly, the ability of the given CM to perform a task or process (such as the demonstrated ability to actually bond to a QAM in the vSG1 frequency range) can be used in guiding vSG allocation decisions for particular devices.

Figure 8B:
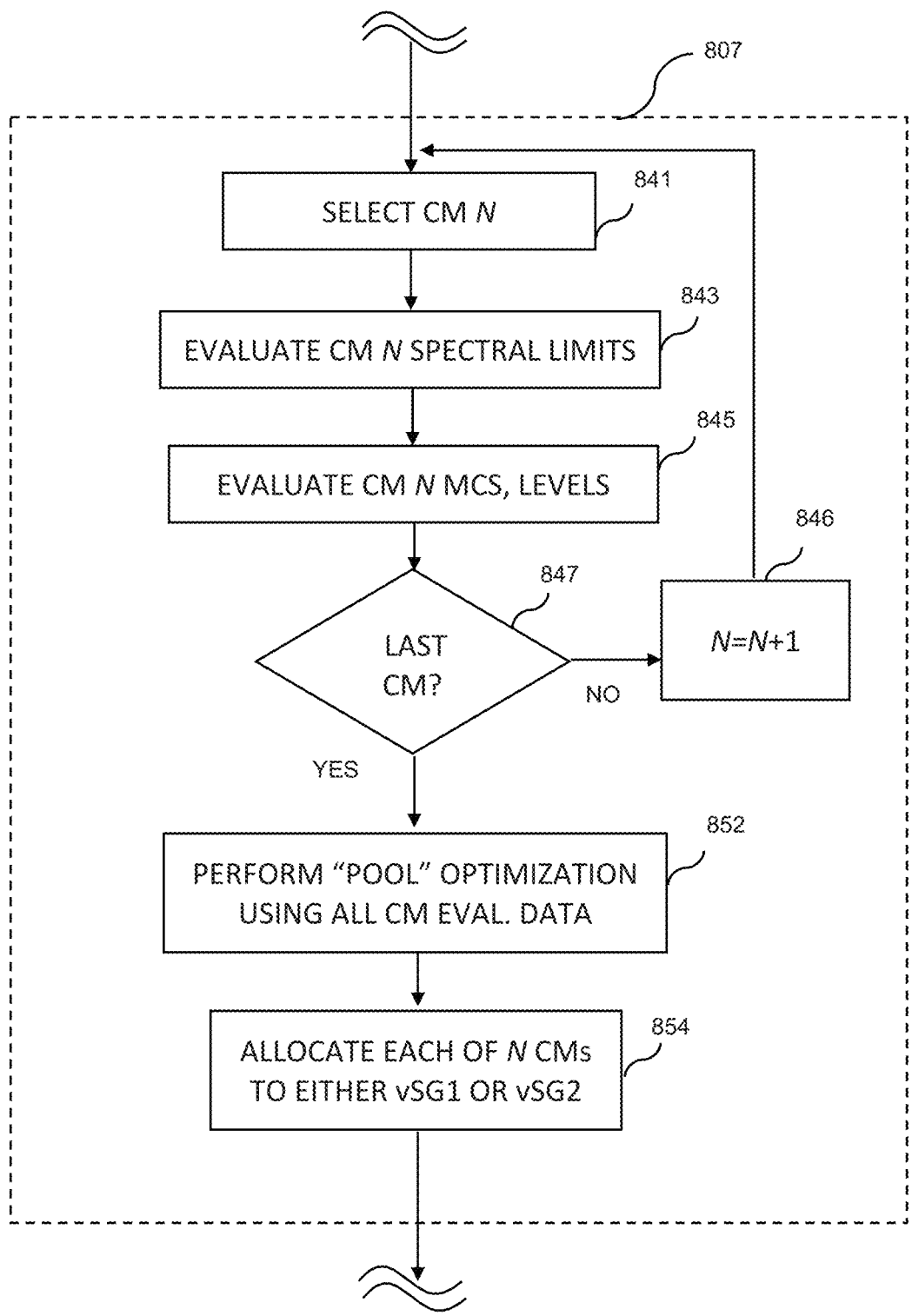
FIG. 8B is a logical flow diagram illustrating a second implementation of the method of FIG. 8, particularly relating to allocation of CMs to different vSGs.

FIG. 8B is a logical flow diagram illustrating a second implementation of the method of FIG. 8, particularly relating to allocation of CMs to different vSGs. In this embodiment, a "pooled" approach is utilized, such as where either multiple CMe's are being added to the network (such as being part of a network/portion upgrade), or the operator wishes to re-allocate or re-evaluate an existing allocation.

Per step 841, a first of N CMs is selected for evaluation, and per steps 843 and 845, the spectral limits and MCS/levels of that CM are determined.

Per step 847, if this CM is not the last to be evaluated as part of the pool, the counter N is incremented per step 846 for the next CM to be evaluated. This process iterates until all CMs have been evaluated per step 847.

At step 852, the pool of CMs are evaluated to determine an optimal allocation, according to one or more optimization criteria. For example, in addition to each modem actually being able to support operation within its prospective allocated vSG, other criteria such as optimal vSG1/vSG2 member size, maintenance or upgrade outage data, business considerations such as subscriber subscription level or tier, historical failure/trouble data, and the like may be used.

Lastly, the vSG allocations for each member CM of the pool are made per step 854.

Figure 9A:
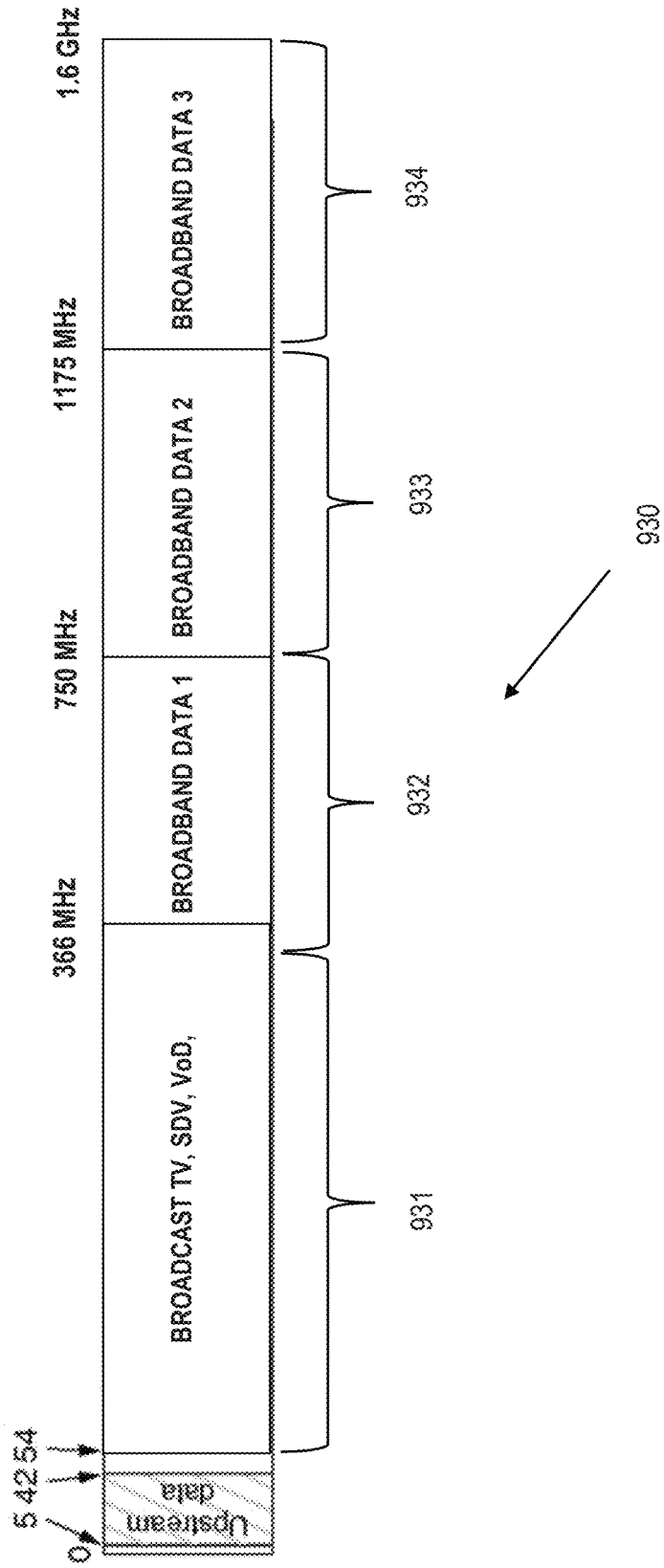
FIG. 9A is a graphical representation illustrating another exemplary embodiment of allocation of frequency channels to virtual service groups (vSGs) according to the present disclosure, wherein three bands and associated vSGs are used.

It will be appreciated that while the foregoing methods are described in the exemplary content of the vSG1/vSG2 model of FIGS. 4A and 4B, a plethora of other allocation schemes may be used consistent with the present disclosure. For instance, FIG. 9A is a graphical representation illustrating another exemplary embodiment of allocation 930 of frequency channels to virtual service groups (vSGs), wherein three broadband data bands and associated vSGs are used in conjunction with a QAM/legacy or "in band" frequency band 931. The data bands 932, 933, 934 may be comprised of both legacy DOCSIS (e.g., 3.0 QAM-based) channels and OFDM-based channels, either individually or intra-band, including up to higher upper frequency values such as 1.6 or 1.8 GHz.

Figure 9B:
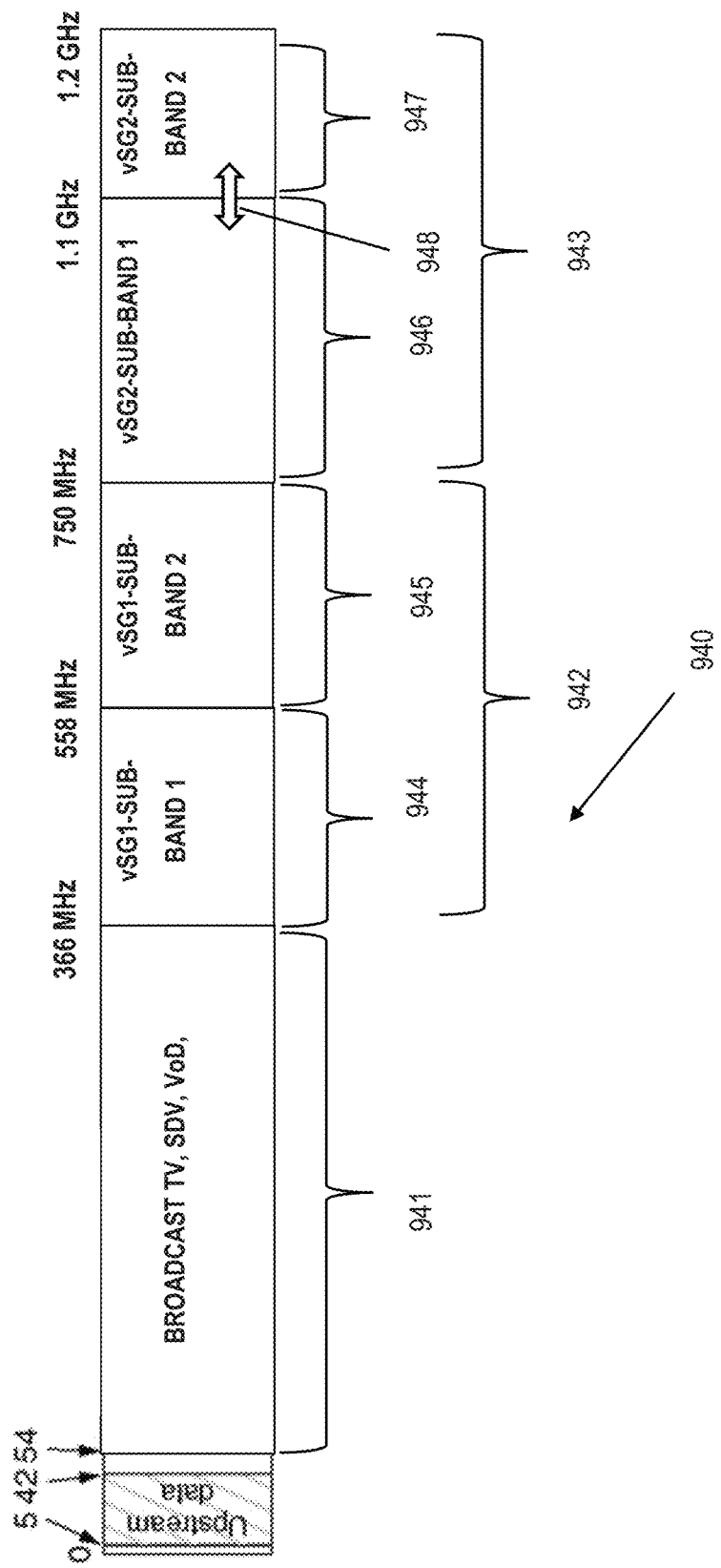
FIG. 9B is a graphical representation illustrating yet another exemplary embodiment of allocation of frequency channels to virtual service groups (vSGs) according to the present disclosure, wherein vSG bands and associated vSG sub-bands are used, including variable size/scalable bands.

FIG. 9B is a graphical representation illustrating yet another exemplary embodiment of allocation 940 of frequency channels to virtual service groups (vSGs) according to the present disclosure, wherein vSG bands 942, 943 and associated vSG sub-bands 944, 945, 946, 947 are used, including variable size/scalable bands 948. For instance, in one model, legacy CMs with certain operating characteristics can be placed in one sub-band 944 (operating in vSG2 942 at or below 750 MHz), while other legacy CMs without such operating or other characteristics may be placed in another sub-band 945. Such characteristics might include for instance those with lower signal levels (due to e.g., interference or location within the topology), those with limited MCS or FEC options (due to e.g., type of device), those associated with a certain tier of subscriber, those associated with a certain pSG, those associated with a certain geographic region, etc.

Likewise CMe 525 may be placed within sub-bands of vSG1 943 based on similar or other conditions. Moreover, the sub-bands associated with vSG1 may be made variable as shown, such as to accommodate "next generation" features such as DS channel bonding or carrier aggregation (CA), mixture of QAM-based and OFDM-based channels used by the CMe, future expansion, reduced ICI (interchannel interference) thereby allowing reduced OFDM carrier spacing, and yet other factors.

It will be further appreciated that the methodologies and apparatus described herein may also be utilized for allocation of CMs and/or CMe's based on other criteria. For instance, within an existing network coaxial topology, there may be some CMs which, by virtue of placement within the topology, distance from an amplifier, amplifier degradation over time, presence of location-specific interferers, and/or other factors, may have lesser signal strength (and hence lesser theoretical data throughput rates due to reduced SINR), although they are identically configured to other CM devices in the same network. These reduced-capacity devices may be for instance on the last "leg" of each optical node's distribution tree or strand (i.e., they may follow a discernable pattern), or alternatively may be (seemingly) randomly distributed, or somewhere in-between (e.g., weakly correlated). As such, it may in some cases be desirable to group or aggregate these devices based on frequency band, such as those associated with particular vSGs. For example, these devices may perform better using one spectral region as opposed to another, such as where they are allocated to a less-used region of the spectrum (which tends to minimize interference from other CMs) so as to minimize their existing signal strength or external interference "penalty."

It will also be recognized that additional "back end" compute or analytical capability may be used in support of analysis of CM-related data (and network operations data), and ultimate allocation of each CM to a vSG as described above. For instance, in one variant, the enhanced node 413 or headend 402 may be in communication via network interfaces and other network processes with machine learning (ML) or deep learning (DL) compute environments such as Microsoft Azure®, Amazon AWS®, or an indigenous compute environment of the MSO itself (e.g. one based on Cisco HyperFlex™ architectural components or the like). Such ML/DL capability can be used to characterize the CM operational environment(s) based on e.g., specific portions of the topology, criteria such as time of day or day of week, types of devices and frequency allocations most commonly used, and other data in order to best optimize placement of particular CM or CMe (or groups thereof) into vSGs, as well as how many vSGs are created, and which frequencies are to be associated with such vSGs. For instance, such analytics may be useful in support of the "pooled" analysis process 852 of FIG. 8B discussed above.

As such, in one embodiment, the vSG creation and allocation process is dynamic; vSGs can be created, and CMe devices migrated thereto for a time, and then migrated to another vSG over time as needed, such as to support maintenance or adjust to equipment outages, network upgrades, load balancing. CMe devices requiring reboot in order to effect a new vSG assignment can simply be "force-rebooted" from the network side, such as periods of non-use by the subscriber (based on e.g., low or no detected data transaction for that CMe).

CMe Apparatus—

Figure 10:
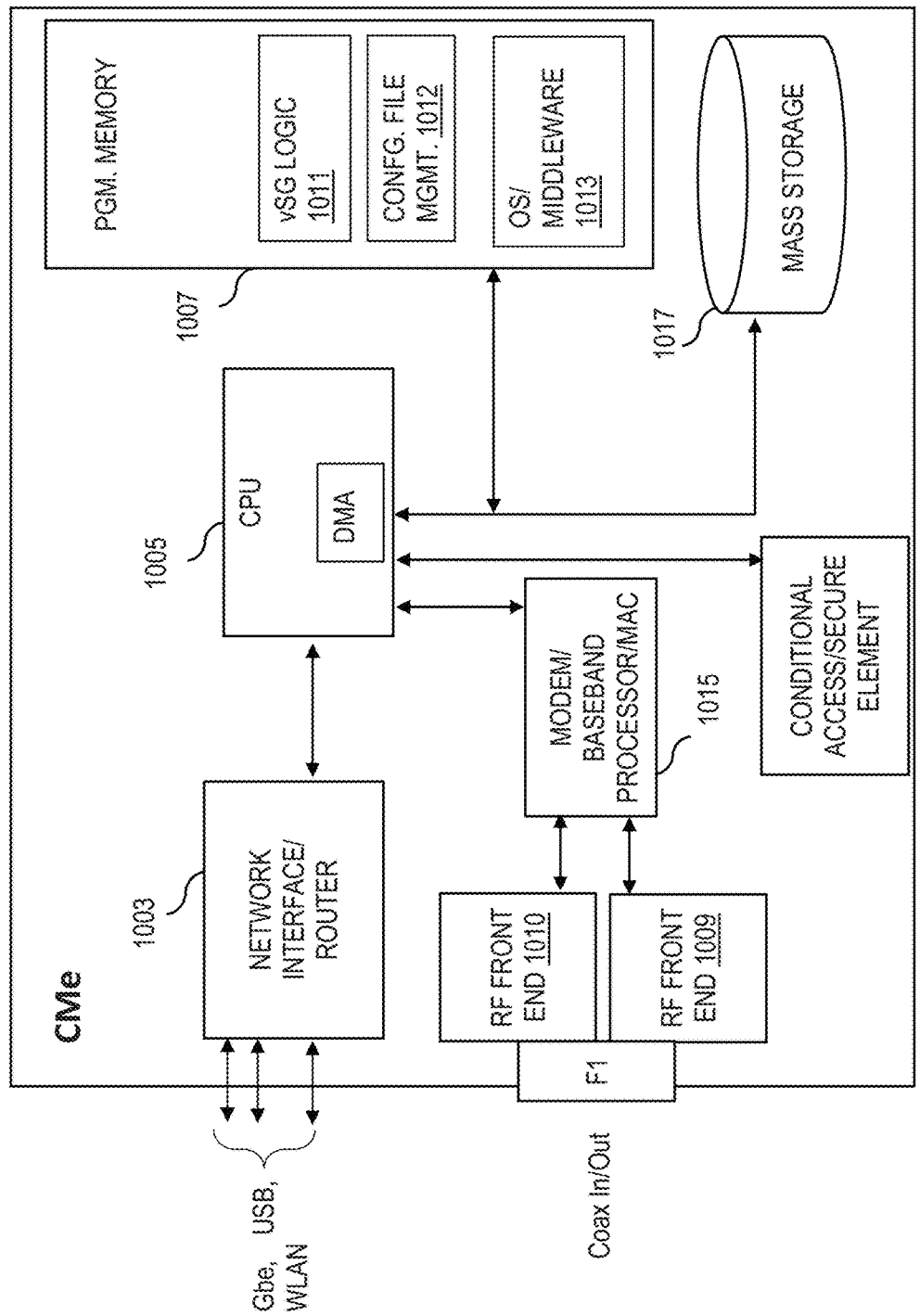
FIG. 10 is a functional block diagram illustrating one embodiment of an exemplary enhanced CM (CMe) according to present disclosure.

FIG. 10 illustrates an exemplary configuration of a CMe apparatus 525 according to the present disclosure.

At high level, the CMe apparatus 525 includes, inter alia, a processor apparatus 1005, a program memory module 1007, mass storage 1017, one or more RF front ends 1009, 1010 for processing RF signals received and transmitted over the coaxial "last mile" network, baseband processor/modem chipset 1015, as well as one or more network interfaces 1003 such as, Gigabit Ethernet or other LAN/WLAN connectivity, support of home or premises gateways, DSTBs, 3GPP small cells, etc. within the premises, etc.

The RF modules 1009, 1010 include a heterodyne-based transmitter/receiver architecture generally symmetrical to the transmitter/receiver of the enhanced CMTSe/node 413 discussed previously; i.e., impedance matching circuitry, diplexer, synchronization circuit, tilt, etc. are used as part of the CMe RF front ends, as well as RF tuner apparatus. The RF front ends are used to convert the received signal from frequency bands (366-750 MHz and 750 MHz-1.2 GHz) to baseband, and the inverse for transmission. A common F1-type connector for interface between the coaxial network and RF front end(s) is shown, although other approaches may be used as well.

Moreover, while two separate RF front ends 1010, 1009 are shown in this embodiment, a single device covering the entirety of the desired frequency range may be used with generally equal success.

The network interface module 1003 may include for example GbE Ethernet/WLAN/USB ports, which allows interface between the CMe module and premises devices such as WLAN routers, DSTB devices, computers, etc., to support data interchange between the CMe and the device.

In the exemplary embodiment, the host processor (CPU) 1005 may include one or more of a digital signal processor, microprocessor, GPU, field-programmable gate array, or plurality of processing components mounted on one or more substrates. The processor 1005 may also comprise an internal cache memory, and is in communication with a memory subsystem 1007, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1005, including the OS and middleware 1013 (e.g., executing a Linux or other kernel).

The processor 1005 is configured to execute at least one computer program stored in memory 1007 (e.g., a non-transitory computer readable storage medium); in the illustrated embodiment, such programs include logic to implement the vSG functionality described previously herein (including configuration file detection/update logic 1012, and logic 1011 for servicing CMTSe data requests for vSG logic implementation). Other embodiments may implement such functionality within dedicated hardware, logic, and/or specialized co-processors or ASICs (not shown).

The CMe logic includes a hierarchy of software layers and communication protocols to enable the RF carrier detection and reporting, communication with the CMTSe 403, interaction with PHY layer and hardware, routing data from/to the HFC network, Layer2/3 functions, etc.

Node/RMD Apparatus—

Figure 11:
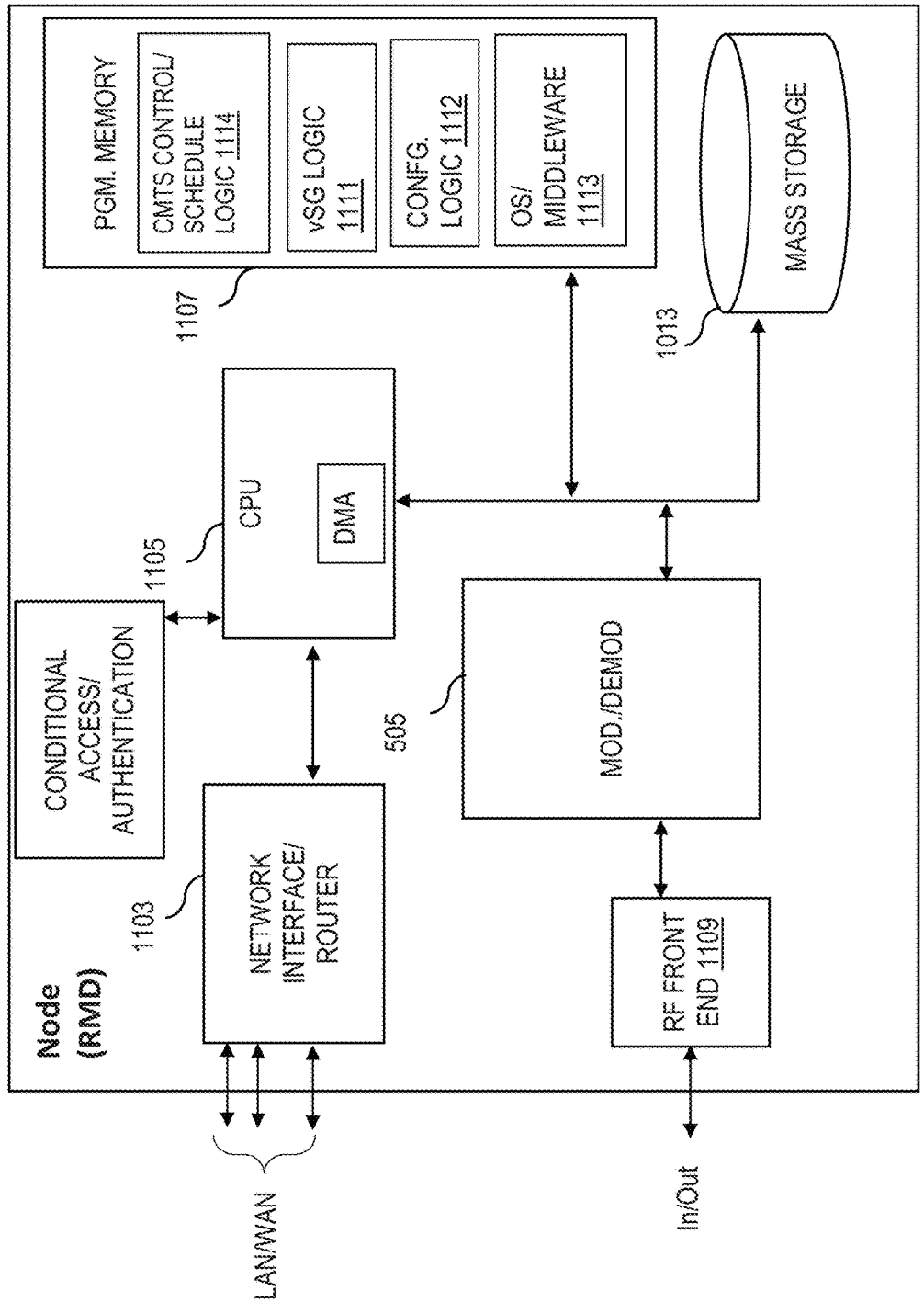
FIG. 11 is a functional block diagram illustrating one embodiment of an exemplary enhanced CMTS (CMTSe) according to present disclosure.

FIG. 11 is a functional block diagram illustrating an exemplary embodiment of a node device 413 according to the present disclosure. In this embodiment, the CMTSe 403 functionality described above, including EQAMs 505a, 505b and supporting processes such as DRFI interface protocols, conditional access/CM authentication, etc., are integrated into a CCAP RMD form factor (such as shown in the embodiment of FIG. 5B), although it will be understood that this is merely exemplary, and other form factors and component/process distributions may be used, including e.g., those distributed across node and headend portions of the network.

As shown, the node device 413 includes, inter alia, a processor apparatus or subsystem 1105, a program memory module 1107, mass storage 1113, and one or more network interfaces and routers 1103, as well as EQAM modulator 505 and associated RF front end 1109 (as well as supporting baseband processor chipsets and other EQAM components, not shown).

At a high level, the exemplary controller/scheduler logic 1114 of FIG. 11 is configured to logically interface with each of the CMs 125 and CMe devices 525 in support of DOCSIS scheduling and channel/resource allocations and timing functions per the DOCSIS standards. Also included is vSG processing logic 1111 which supports collection of data from the various CM/CMe devices (such as during execution of the method of FIGS. 7A-7B), as well as evaluation of that data and allocation of the CM or CMe devices to the vSGs created.

Also included is configuration logic 1112, which supports management of configuration data for the various CM/CMe devices (including generation and provision of new configuration files for each CMe as previously described).

In the exemplary embodiment, the processor 1007 may include one or more of a digital signal processor, microprocessor, field-programmable gate array, or plurality of processing components mounted on one or more substrates. The processor 1007 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1105, including the RMD OS and middleware 1113 (e.g., executing a Linux or other kernel).

As previously noted, the node 413 may include "complex" modulators 505a, 505b which include both EQAM and OFDM modulation capability. For instance, traditional EQAM capability may be provided for DOCSIS 3.0 only devices within either vSG1 or vSG2, while OFDM modulators (i.e., iFFT, P/S conversion, etc.) necessary to schedule time/frequency resource blocks (RBs) for transmission downstream according to DOCSIS 3.1 protocols may be used to generate waveforms within e.g., vSG1 only.

Network Upgrade—

Figure 12:
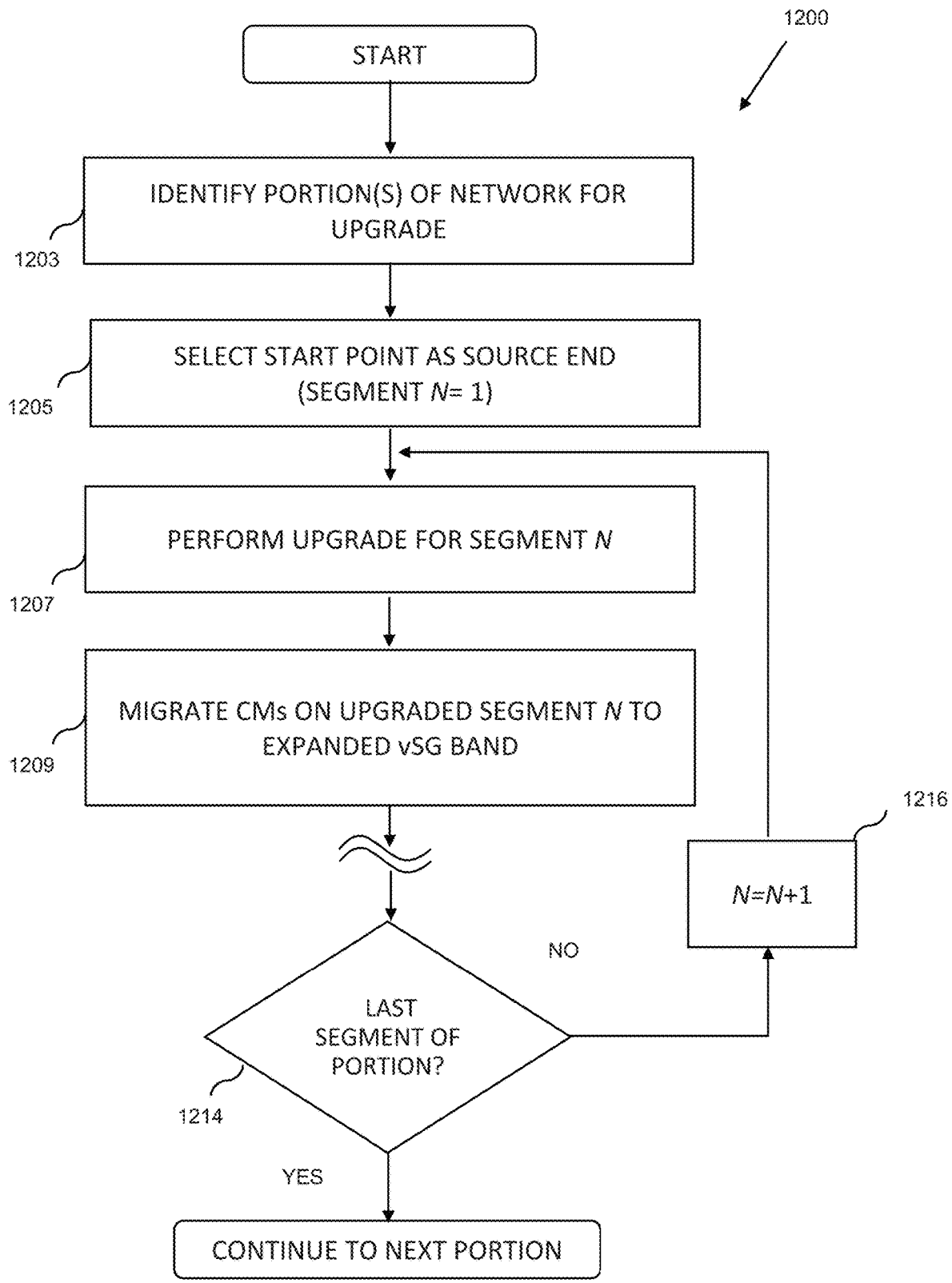
FIG. 12 is a logical flow diagram illustrating one embodiment of a generalized method of upgrading an extant HFC plant for virtual service group functionality according to present disclosure.

FIG. 12 is a logical flow diagram illustrating one embodiment of a generalized method of upgrading an extant HFC plant for virtual service group functionality according to present disclosure.

As shown in FIG. 12, the method 1200 includes first identifying one or more portions of the extant HFC network requiring upgrade per step 1203. In this context, the desire may be to accommodate additional planned new users that will be added to the identified portion(s) of network, such as by way of increased customer base, additional of new MDU or residential housing in a given area, a new university or enterprise campus, or any number of other scenarios. Without vSG capability, the existing 750-MHz limited network infrastructure may rapidly become overloaded, thereby reducing QoE for both new and existing subscribers.

Per step 1205, a starting point for the upgrade is selected. For instance, in the context of FIG. 4A discussed supra, the optical node 413 where the optical and coaxial topologies interface may be a logical choice for reasons discussed subsequently herein. This starting point or segment of the coaxial topology can be demarcated by e.g., the optical node on one end, and the next downstream amplifier 114, and each subsequent segment can be similarly demarcated by convenient or logical equipment boundaries.

Per step 1207, the first segment is upgraded, such as through addition of the RMD node apparatus with CMTSe of FIG. 11 at the optical node 413, or upon RMD upgrade such as to an extended DOCSIS head-end integrated CMTS. This expands the capability for both (i) expanded frequency range and vSG capability to the demarcation point (next amplifier 114), and (ii) expanded frequency range and vSG capability for the remainder of the downstream segments from that node once upgraded (frequency range) amplifiers and taps are added downstream of the node 413.

Per step 1209, using e.g., the procedures of FIGS. 7A-7B herein, newly added/enabled CMes 525 can then utilize the upgraded network segment to be migrated or allocated to vSG1 (e.g., 750-1200 MHz), thereby offloading users from that segment and hence the entire coaxial "strand" served by the node 413 as a whole. For instance, concurrent with node upgrade, the MSO may distribute vSG-enabled CMe devices 525 to some or all customer son the first segment.

Per steps 1214 and 1216, the next segment is identified (at a time desired by the MSO from a CAPEX or other perspective) and upgraded until the entire coaxial distribution "strand" has been completed. Likewise, other nodes 413 on the optical ring or topology may be similar upgraded, whether in parallel or sequence, thereby providing the MSO with a completely controlled migration.

Figure 13A:
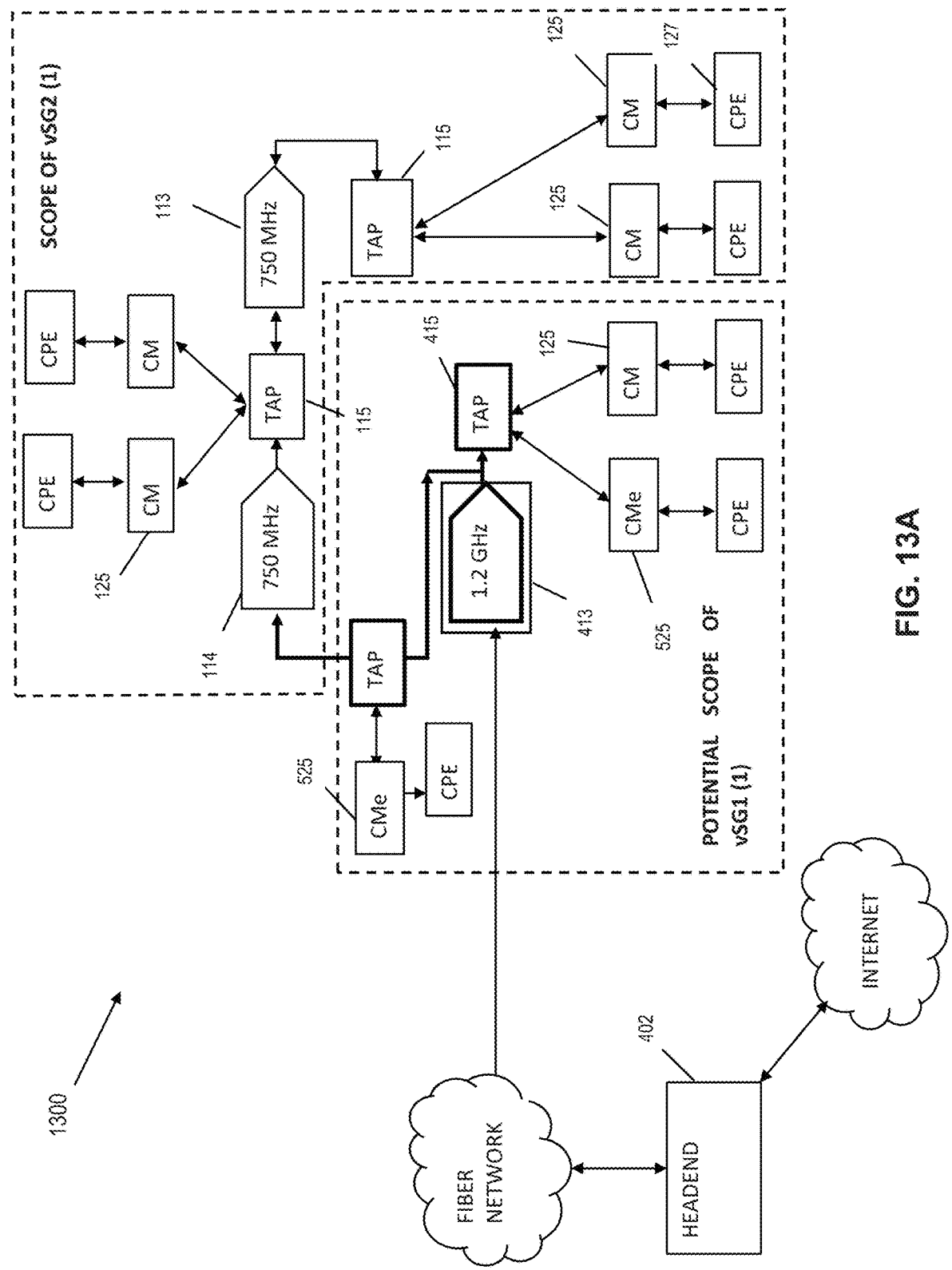
FIGS. 13A-13C are block diagrams illustrating various respective successive stages of upgrade of the network according to the method of FIG. 12.
Figure 13B:
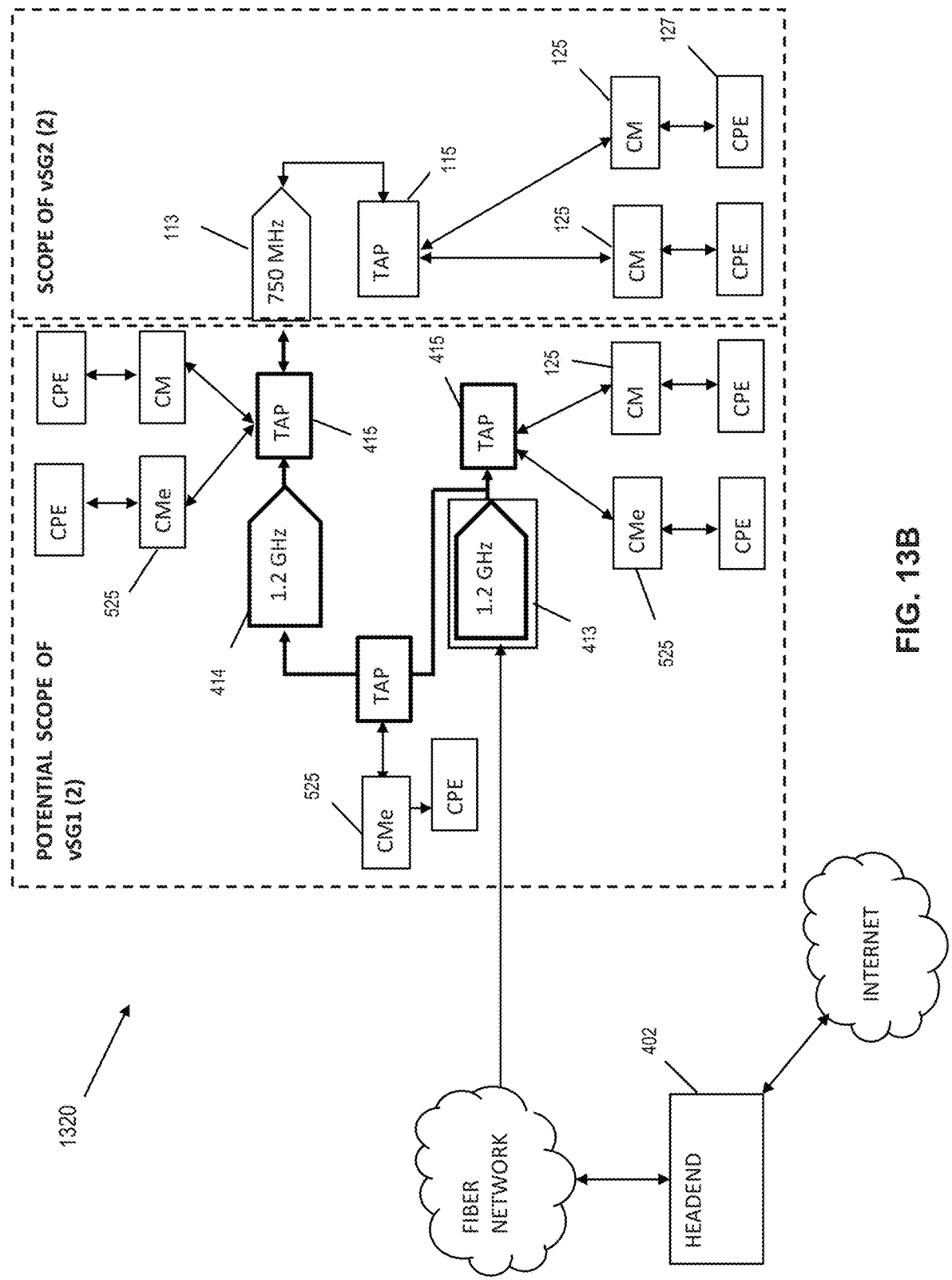
Figure 13C:
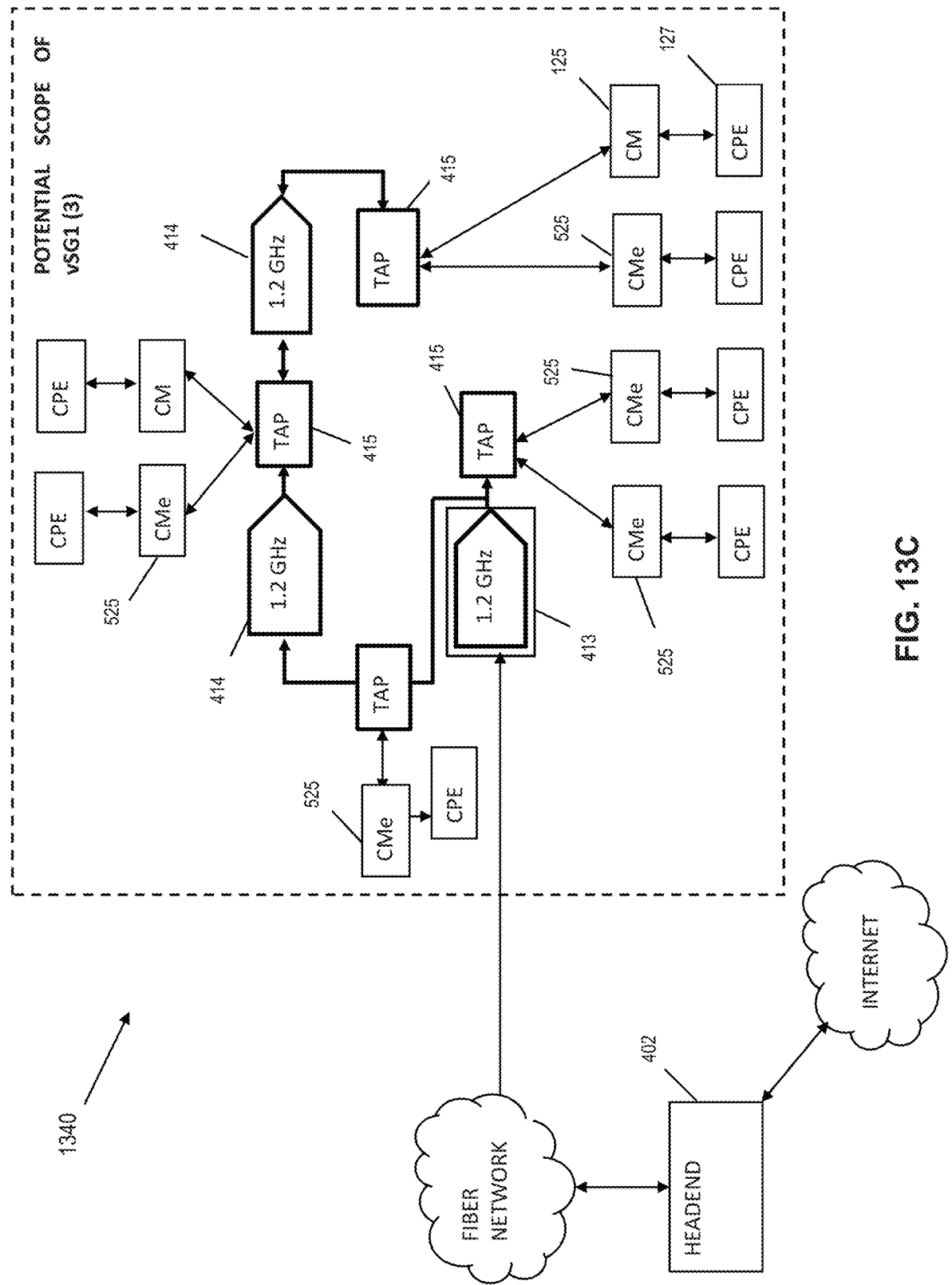

FIGS. 13A-13C are block diagrams illustrating various respective successive stages 1300, 1320, 1340 of upgrade of the network according to the method of FIG. 12, including the potential scope of vSG-based service provision at each stage. As shown, as the scope of higher-frequency/vSG coverage expands, the MSO is afforded the opportunity to selectively utilize or not utilize upgraded CMs (i.e., CMe) anywhere within the scope, since under the vSG paradigm of FIG. 4 for example, legacy DOCSIS bands are maintained and expanded (vSG1) bands are available. For instance, a new customer might get a new DOCSIS 3.1/OFDM-capable device with vSG functionality when they move in, while an existing homeowner right next door may still have a legacy 3.0 device with no vSG functionality. Both are part of an identical pSG, but may be in different vSGs.

In one deployment model, the MSO may upgrade a node servicing two or three physical SGs (pSGs) so that it is capable of operation up to 1.2 GHz, and as new subscribers are added to those pSGs, they are given CMe 525 and placed into vSG1 (the expanded spectrum) so as to avoid overcrowding of all the legacy CMs 125 utilizing vSG2.

In another deployment model, the MSO may upgrade a node servicing two or three physical SGs (pSGs) so that it is capable of operation up to 1.2 GHz, and extant subscribers within an upstream pSG of the first amplifier scope (see FIG. 4A) are given CMe 525 and placed into vSG1 (the expanded spectrum), while the users in the other pSGs (i.e., those downstream of the next amplifier 114) continue to use legacy CMs 125 which utilize vSG2.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Controller apparatus configured for operation within a data distribution network, comprising:
   network interface apparatus configured for exchanging data with the data distribution network;
   processor apparatus in data communication with the network interface apparatus; and
   storage apparatus in data communication with the processor apparatus and comprising a storage medium, the storage medium comprising at least one computer program, the at least one computer program configured to, when executed on the processor apparatus, cause the controller apparatus to:
   obtain data associated with respective ones a plurality of modem apparatus within the data distribution network; and
   evaluate the obtained data to determine optimal allocations of each of the plurality of modem apparatus to respective virtual service groups (vSGs) formed within the data distribution network.

2. The controller apparatus of claim 1, wherein the data distribution network comprises a hybrid fiber/coaxial cable distribution network.

3. The controller apparatus of claim 1, wherein the controller apparatus comprises a headend-based cable modem termination system (CMTS), and the network interface apparatus comprises an analog optical network interface.

4. The controller apparatus of claim 1, wherein the controller apparatus comprises apparatus comprises a RMD (Remote MAC Device), and the network interface apparatus comprises a digital optical network interface.

5. The controller apparatus of claim 1, wherein the at least one computer program is further configured to, when executed on the processor apparatus, cause the controller apparatus to:
   dynamically allocate each of the plurality of modem apparatus to the respective VSGs based on (i) availability of spectrum in each of the VSGs, and (ii) an ability of each of the plurality of modem apparatus to access the spectrum in each of the VSGs.

6. The controller apparatus of claim 1, wherein the obtained data comprises data relating to data rates respectively associated with the plurality of modem apparatus, and the optimal allocations of each of the plurality of modem apparatus to the respective vSGs comprises grouping the plurality of modem apparatus to the respective vSGs based on at least the respective data rates thereof.

7. The controller apparatus of claim 1, wherein the at least one computer program is further configured to, when executed on the processor apparatus, cause the controller apparatus to:
   transmit radio frequency (RF) waveforms respective frequency bands respectively associated with the vSGs onto a wireline medium of the data distribution network, at least a first portion of the RF waveforms being orthogonal frequency division multiplex (OFDM) modulated and at least a second portion of the RF waveforms being quadrature amplitude modulation (QAM) modulated.

8. The controller apparatus of claim 1, wherein the at least one computer program is further configured to, when executed on the processor apparatus, cause the controller apparatus to:
   based on the determination of the optimal allocations, transmit respective configuration data to each of the plurality of modem apparatus, the respective configuration data causing individual ones the plurality of modem apparatus to selectively utilize only one of the vSGs for at least a period of time.

9. A computerized method of optimizing traffic within a network, the computerized method comprising:
   configuring at least one first frequency band to be associated with a first virtual service group (vSG);
   configuring at least one second frequency band to be associated with a second vSG;
   performing a characterization process to allocate at least a first portion of a plurality of user premises devices to the first vSG and at least a second portion of the plurality of user premises devices to the second vSG; and
   based on the allocation, transmitting data within the at least one first frequency band to the at least first portion of the plurality of user premises devices, and within the at least one second frequency band to the at least second portion of the plurality of user premises devices.

10. The computerized method of claim 9, wherein the performing of the characterization process comprises utilizing a ranking algorithm to assign the at least first portion of the plurality of user premises devices to the first vSG and the at least second portion of the plurality of user premises devices to the second vSG, the ranking algorithm configured to rank the plurality of user premises devices based on data relating to: (i) a highest DOCSIS version which the plurality of user premises devices respectively support, and (ii) at least one frequency range which the plurality of user premises devices are respectively capable of operation within.

11. The computerized method of claim 9, further comprising allocating the plurality of user premises devices to the at least one of the first frequency band or the second frequency band, the allocating comprising categorizing the plurality of user premises devices as belonging to at least one of the first vSG or the second vSG, the first vSG corresponding to an added or expanded capability frequency band, the second vSG corresponding to one or more legacy frequency bands.

12. The computerized method of claim 11, wherein:
the network comprises a hybrid fiber coax (HFC) cable network;
the one or more legacy frequency bands comprise a band between approximately 366 MHz and 750 MHz; and
the added or expanded capability frequency band comprises a band between approximately 750 MHz and 1.2 GHz.

13. The computerized method of claim 9, wherein:
the plurality of user premises devices comprise in-service modems and extant modems; and
the allocation of the at least first portion of the plurality of user premises devices to the first vSG and the at least second portion of the plurality of user premises devices to the second vSG comprises:
selectively offloading individual ones of the in-service modems operating within the network to a designated portion of an operating spectrum within an upgraded or improved portion of the network to reduce load and necessity to upgrade at least one of the extant modems or infrastructure servicing the extant modems.

14. The computerized method of claim 9, wherein:
the plurality of user premises devices comprise upgraded modems which are upgraded to be capable of operation in both of the at least one first and second frequency bands respectively associated with first and second vSGs;
the first vSG comprises a higher-frequency vSG associated with a higher frequency than the second vSG;
the second vSG comprise a legacy vSG associated with a lower frequency than the first vSG; and
the allocation of the at least first portion of the plurality of user premises devices to the first vSG and the at least second portion of the plurality of user premises devices to the second vSG comprises:
selectively offloading the upgraded modems to the higher-frequency vSG to reduce loading on the legacy vSG, thereby obviating or deferring upgrade of at least one of legacy infrastructure or legacy modems associated with the legacy vSG.

15. The computerized method of claim 9, further comprising disabling one or more load balancing features associated with at least one of the plurality of user premises devices capable of operating within either of the first or second frequency bands.

16. The computerized method of claim 9, wherein the allocation of the at least first portion of the plurality of user premises devices to the first vSG and the at least second portion of the plurality of user premises devices to the second vSG comprises selectively causing allocation of each of the plurality of user premises devices to a respective one of the first or second vSGs based on respective then-existing loads associated with the first and second frequency bands.

17. The computerized method of claim 9, wherein the allocation of the at least first portion of the plurality of user premises devices to the first vSG and the at least second portion of the plurality of user premises devices to the second vSG comprises selectively causing the allocation of the at least first portion of the plurality of user premises devices to the first vSG and the at least second portion of the plurality of user premises devices to the second vSG based on planned future upgrades to at least a portion of the network.

18. The computerized method of claim 17, wherein:
the network comprises a hybrid fiber coax (HFC) architecture;
the selectively causing of the allocation of the at least first portion of the plurality of user premises devices to the first vSG and the at least second portion of the plurality of user premises devices to the second vSG based on the planned future upgrades to the at least portion of the network comprises selectively causing the allocation of the at least first portion of the plurality of user premises devices to the first vSG and the at least second portion of the plurality of user premises devices to the second vSG only after the upgrade to the at least portion of the network has been completed; and
the at least portion of the network comprises a portion of coaxial cable infrastructure within the HFC architecture.

19. Computer readable apparatus comprising a non-transitory storage medium, the non-transitory storage medium comprising at least one computer program having a plurality of instructions, the plurality of instructions configured to, when executed on a processing apparatus, cause a computerized modem apparatus to:
receive configuration data from a computerized network apparatus, the configuration data causing the computerized modem apparatus to utilize one of a plurality of virtual service groups associated with a managed data network.

20. The computer readable apparatus of claim 19, wherein:
the plurality of instructions configured to, when executed on the processing apparatus, cause the computerized modem apparatus to:
read the received configuration data upon a reboot event; and
the utilization comprises causation of the computerized modem apparatus to (i) tune a first network interface apparatus of the computerized modem apparatus to a frequency band; and (ii) invoke modem negotiation protocols with the computerized network apparatus to establish data service for the computerized modem apparatus using at least portions of the frequency band.

* * * * *